(12) United States Patent
Fujita et al.

(10) Patent No.: US 11,996,769 B2
(45) Date of Patent: May 28, 2024

(54) NOISE FILTER

(71) Applicants: Mitsubishi Electric Corporation, Tokyo (JP); Mitsubishi Electric Engineering Company, Limited, Tokyo (JP)

(72) Inventors: Yuki Fujita, Tokyo (JP); Yasuaki Furusho, Tokyo (JP); Hiroyuki Ichinose, Tokyo (JP)

(73) Assignees: MITSUBISHI ELECTRIC CORPORATION, Tokyo (JP); MITSUBISHI ELECTRIC ENGINEERING COMPANY, LIMITED, Tokyo (JP)

( * ) Notice: Subject to any disclaimer, the term of this patent is extended or adjusted under 35 U.S.C. 154(b) by 56 days.

(21) Appl. No.: 17/920,076

(22) PCT Filed: Jun. 4, 2020

(86) PCT No.: PCT/JP2020/022062
§ 371 (c)(1),
(2) Date: Oct. 20, 2022

(87) PCT Pub. No.: WO2021/245865
PCT Pub. Date: Dec. 9, 2021

(65) Prior Publication Data
US 2023/0179176 A1 Jun. 8, 2023

(51) Int. Cl.
*H02M 1/44* (2007.01)
*H02M 1/12* (2006.01)

(52) U.S. Cl.
CPC ............. *H02M 1/44* (2013.01); *H02M 1/123* (2021.05)

(58) Field of Classification Search
CPC ................. H02M 1/123; H02M 1/44
(Continued)

(56) References Cited

U.S. PATENT DOCUMENTS 5,831,842 A * 11/1998 Ogasawara ............. H02M 1/12
363/40
9,130,542 B1 * 9/2015 Ishihara ............... H03H 11/126
(Continued)

FOREIGN PATENT DOCUMENTS

JP  2000-201044 A  7/2000
JP  2001-69762 A  3/2001
(Continued)

OTHER PUBLICATIONS

Extended European Search Report dated Jun. 9, 2023 in corresponding European Patent Application No. 20939355.2, 7 pages.
(Continued)

*Primary Examiner* — William Hernandez
(74) *Attorney, Agent, or Firm* — XSENSUS LLP

(57) ABSTRACT

A noise filter includes: a voltage detector which detects a common mode voltage generated by a power converter; a voltage division circuit which outputs a division voltage obtained by dividing the common mode voltage detected by the voltage detector; a plurality of common mode transformers which superimpose injection voltages each having a polarity opposite to a polarity of the common mode voltage onto an output from or an input to the power converter; and an injection waveform generator which generates, on the basis of the division voltage, output voltages to be outputted to primary sides of the plurality of common mode transformers. The injection waveform generator generates the output voltages such that a difference between the common mode voltage and a total injection voltage obtained by summing the injection voltages to be superimposed by the plurality of common mode transformers is equal to or smaller than an allowable value.

20 Claims, 12 Drawing Sheets

(58) Field of Classification Search
USPC .................................................. 327/551, 552
See application file for complete search history.

(56) References Cited

U.S. PATENT DOCUMENTS

| | | | | |
|---|---|---|---|---|
| 2006/0034364 | A1* | 2/2006 | Breitzmann | ...... H02M 7/53871 |
| | | | | 375/238 |
| 2012/0068655 | A1* | 3/2012 | Inuduka | .................. H02P 25/24 |
| | | | | 318/494 |
| 2018/0278176 | A1 | 9/2018 | Ogasawara et al. | |

FOREIGN PATENT DOCUMENTS

| | | | |
|---|---|---|---|
| JP | 2010-057268 | A | 3/2010 |
| JP | 2017-51085 | A | 3/2017 |
| JP | 6491349 | B2 | 3/2019 |
| JP | 2019-080469 | A | 5/2019 |
| WO | 00/07274 | A2 | 2/2000 |

OTHER PUBLICATIONS

International Search Report and Written Opinion dated Sep. 1, 2020, received for PCT Application PCT/JP2020/022062, filed on Jun. 4, 2020, 9 pages including English Translation.

* cited by examiner

NOISE FILTER

CROSS-REFERENCE TO RELATED APPLICATION

The present application is based on PCT filing PCT/JP2020/022062, filed Jun. 4, 2020, the entire contents of which is incorporated herein by reference.

TECHNICAL FIELD

The present disclosure relates to a noise filter.

BACKGROUND ART

In recent years, increase of carrier frequencies has been progressing for power conversion devices such as voltage-type pulse width modulation (PWM) inverters in association with development of power semiconductor elements. However, in association with increase of carrier frequencies, electromagnetic interference caused by common mode voltage generated at the time of switching operations of power semiconductor elements has become a problem. As a countermeasure against the problem, a method has been proposed in which a voltage (offset voltage) for offsetting a common mode voltage generated by a power conversion device is superimposed by using a common mode transformer so as to suppress leakage current, i.e., common mode current, flowing to a ground owing to the common mode voltage (for example, Patent Document 1).

A common mode suppressing circuit in Patent Document 1 includes: the common mode transformer having secondary-side coils, i.e., secondary windings, that are provided on respective three-phase cables connecting an inverter and a motor to each other; a capacitor connected in series to a primary-side coil, i.e., a primary winding, of the common mode transformer; a capacitor group which detects a common mode voltage; and an emitter follower circuit which outputs, to the primary winding of the common mode transformer, an offset voltage obtained by performing power amplification on the common mode voltage. In the common mode suppressing circuit in Patent Document 1, the turn ratio between the primary winding and the secondary windings of the common mode transformer is 1:1, and a common mode voltage having a frequency equal to or higher than a switching frequency is offset so that the common mode transformer for superimposing the offset voltage is downsized as compared to the case where the common mode voltage is set to 0.

CITATION LIST

Patent Document

Patent Document 1: Japanese Patent No. 6491349

SUMMARY OF THE INVENTION

Problems to be Solved by the Invention

However, the common mode suppressing circuit in Patent Document 1 has a problem that, if the switching frequency is low, the time product of magnetic fluxes generated in a core is increased so that a core to be used for the common mode transformer is upsized.

An object of the present disclosure is to provide a noise filter in which a common mode voltage can be reduced by using common mode transformers having small sizes even if a switching frequency is low.

Solution to the Problems

A noise filter according to one aspect of the present disclosure is a noise filter for reducing a common mode voltage generated by a power converter which performs power conversion through a switching operation of a semiconductor element. The noise filter includes: a voltage detector which detects the common mode voltage generated by the power converter; a voltage division circuit which outputs a division voltage obtained by dividing the common mode voltage detected by the voltage detector; a plurality of common mode transformers which superimpose injection voltages each having a polarity opposite to a polarity of the common mode voltage onto an output from or an input to the power converter; and an injection waveform generator which generates, on the basis of the division voltage, output voltages to be outputted to primary sides of the plurality of common mode transformers. The injection waveform generator generates the output voltages such that a difference between the common mode voltage and a total injection voltage obtained by summing the injection voltages to be superimposed by the plurality of common mode transformers is equal to or smaller than an allowable value.

Effect of the Invention

The noise filter according to the one aspect of the present disclosure includes the plurality of common mode transformers, and the injection waveform generator generates the output voltages such that the difference between the common mode voltage and the total injection voltage obtained by summing the injection voltages to be superimposed by the plurality of common mode transformers is equal to or smaller than the allowable value. Consequently, a common mode voltage can be reduced by using common mode transformers having small sizes even if a switching frequency is low.

DESCRIPTION OF EMBODIMENTS

Figure 1:
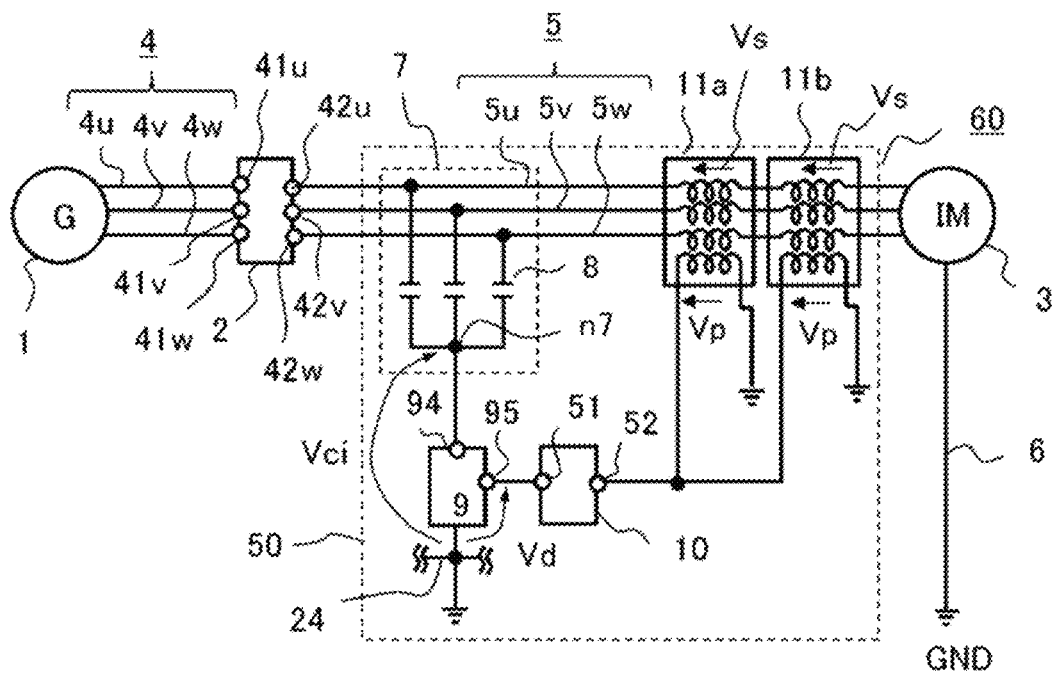
FIG. 1 illustrates a configuration of a first noise filter and an electric motor drive system according to embodiment 1.

Noise filters and electric motor drive systems will be described with reference to the drawings. The same or corresponding portions in the drawings will be described while being denoted by the same reference characters.

Embodiment 1

Figure 2:
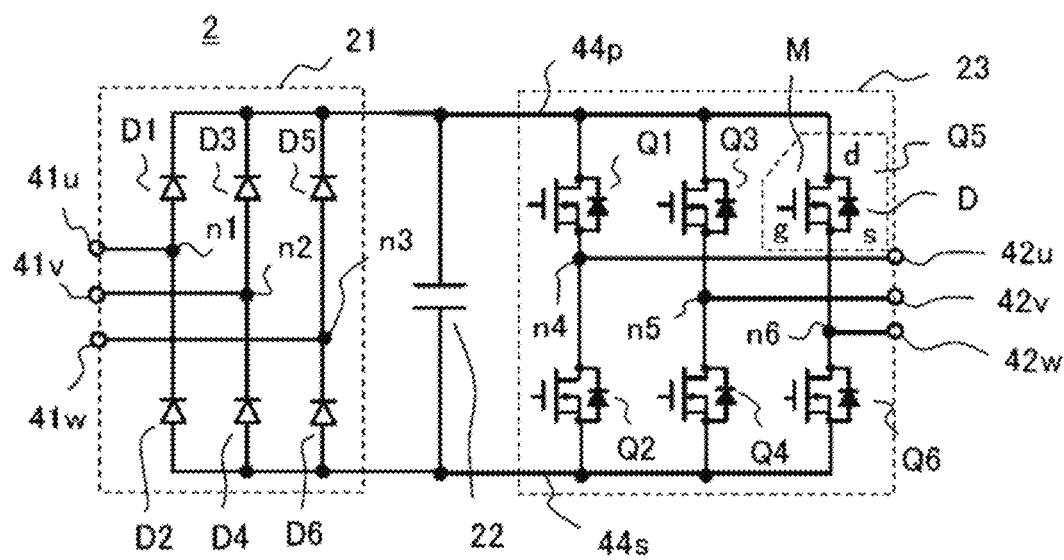
FIG. 2 illustrates a configuration of a power converter in FIG. 1.
Figure 3:
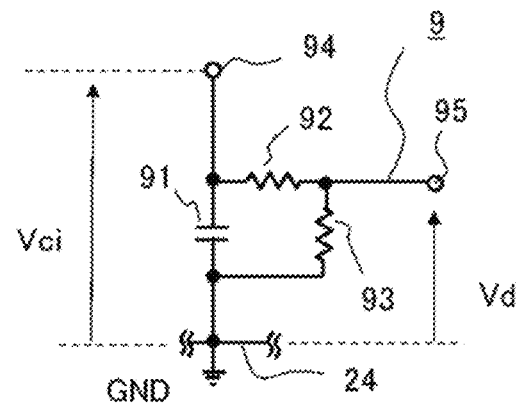
FIG. 3 illustrates a configuration of a voltage division circuit in FIG. 1.
Figure 4:
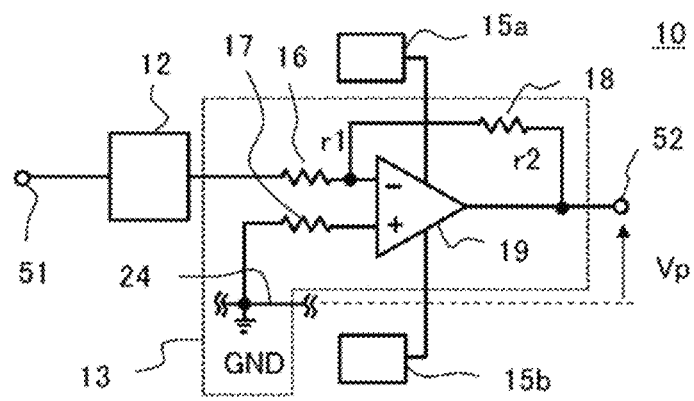
FIG. 4 illustrates a first example of an injection waveform generator in FIG. 1.
Figure 5:
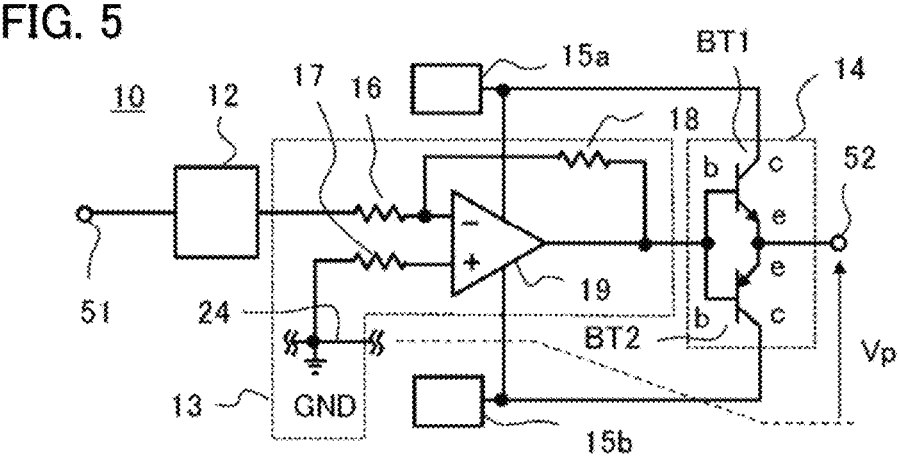
FIG. 5 illustrates a second example of the injection waveform generator in FIG. 1.
Figure 6:
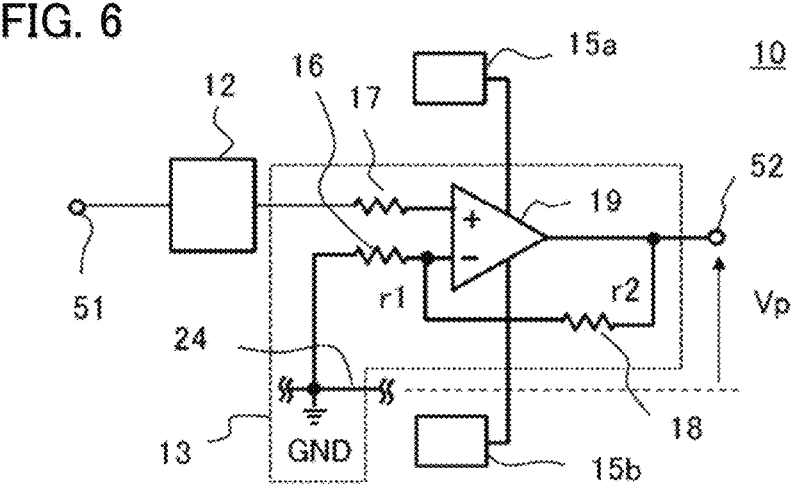
FIG. 6 illustrates a third example of the injection waveform generator in FIG. 1.
Figure 7:
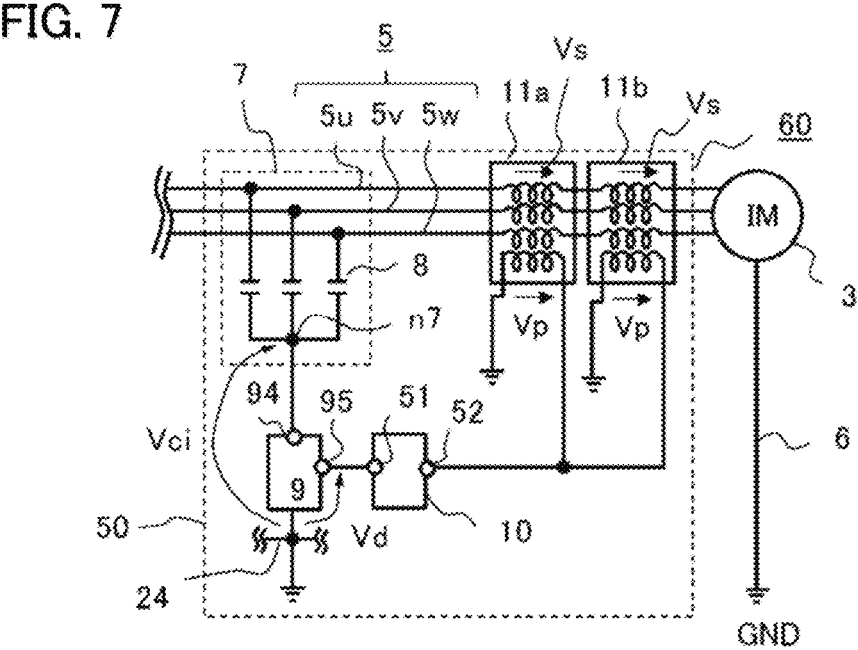
FIG. 7 illustrates a configuration of a second noise filter and the electric motor drive system according to embodiment 1.
Figure 8:
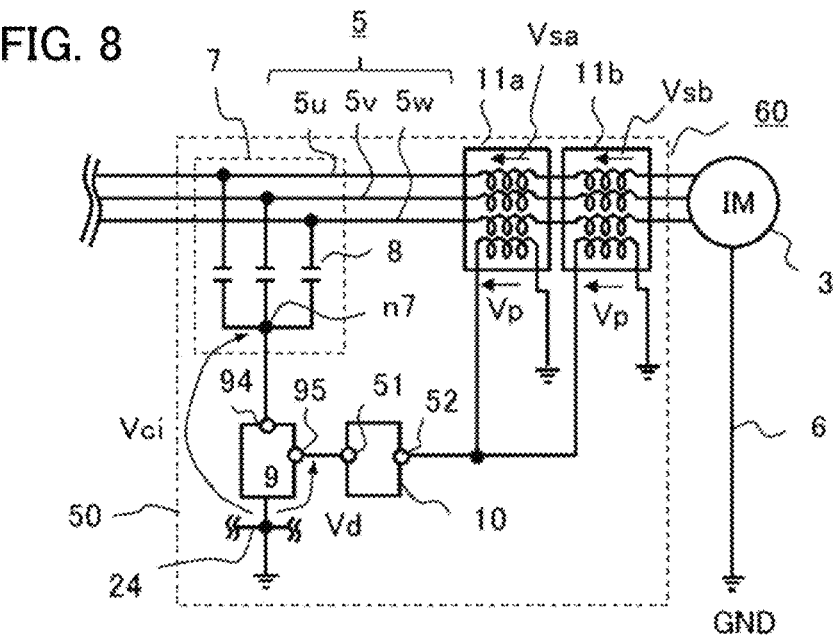
FIG. 8 illustrates a configuration of a third noise filter and the electric motor drive system according to embodiment 1.
Figure 9:
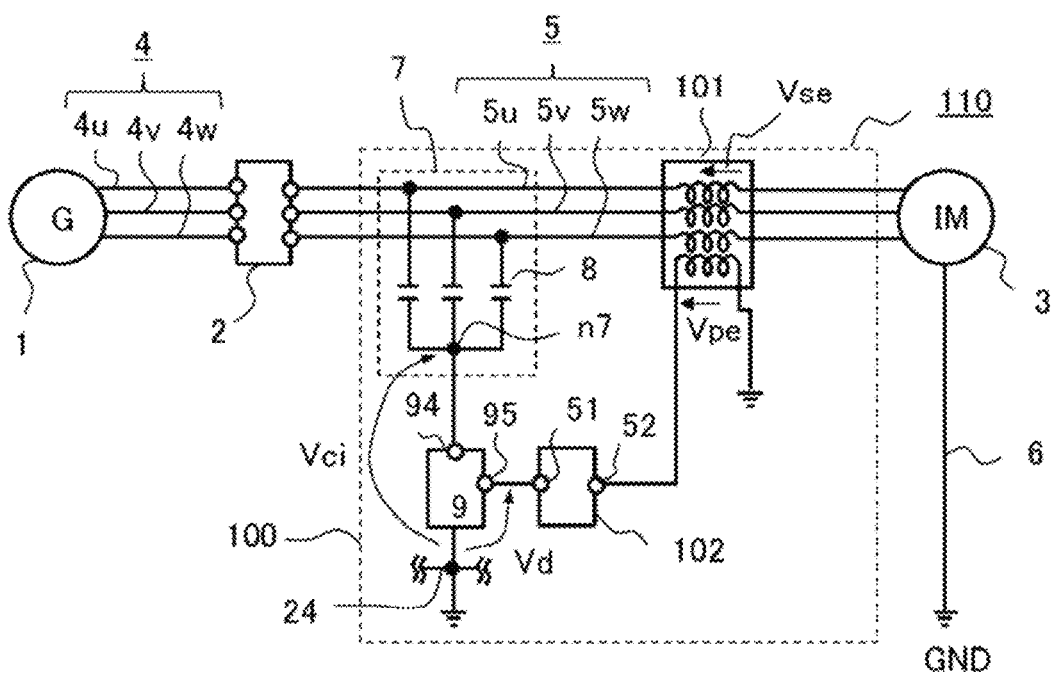
FIG. 9 illustrates a configuration of a noise filter and an electric motor drive system in a comparative example.
Figure 10:
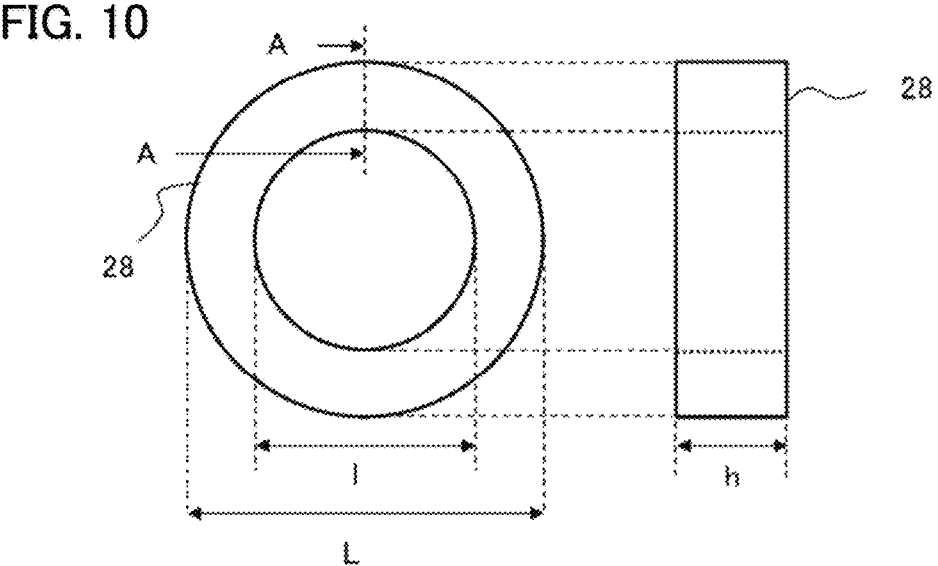
FIG. 10 illustrates a core in any of the noise filters according to embodiment 1.
Figure 11:
FIG. 11 is a cross-sectional view taken along a broken line indicated by A-A in FIG. 10.
Figure 12:
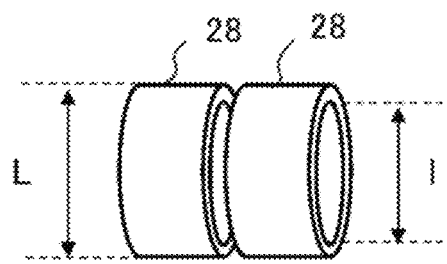
FIG. 12 is a perspective view showing cores in the noise filter according to embodiment 1.
Figure 13:
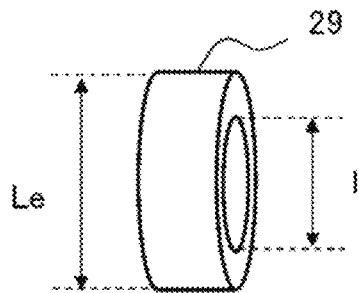
FIG. 13 is a perspective view showing a core in the noise filter in the comparative example.
Figure 14:
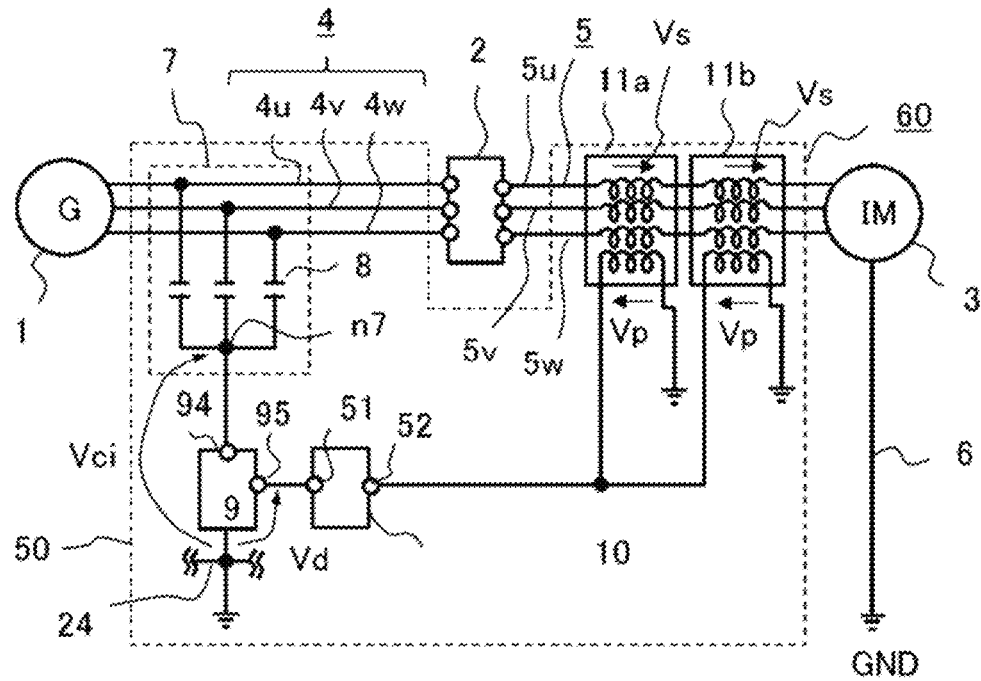
FIG. 14 illustrates a configuration of a fourth noise filter and the electric motor drive system according to embodiment 1.
Figure 15:
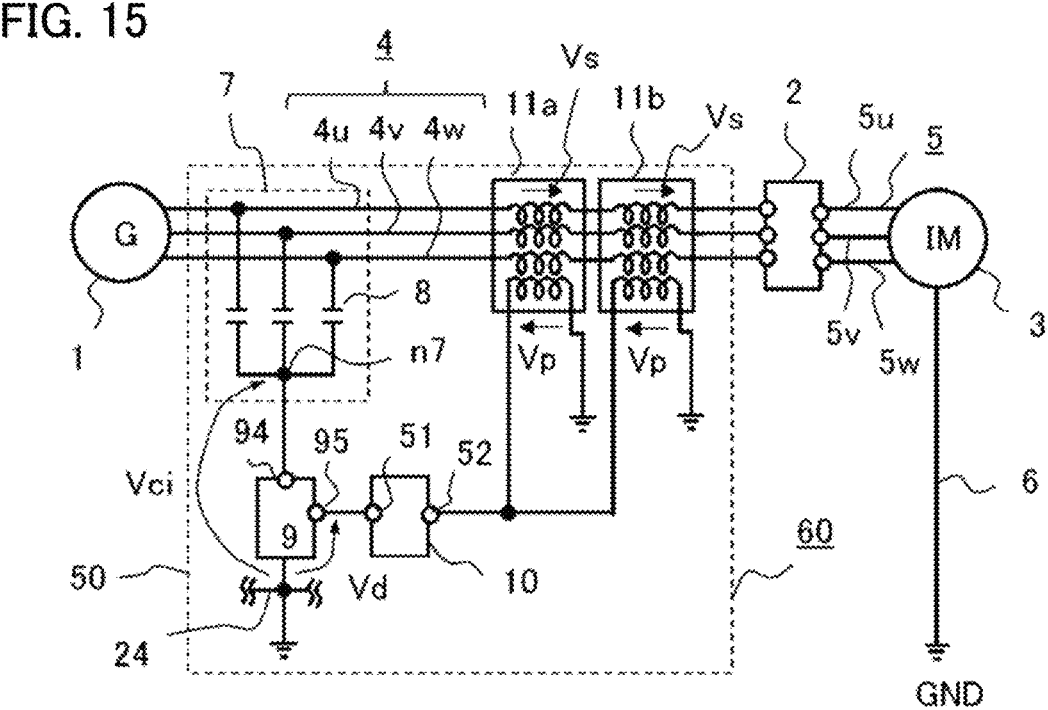
FIG. 15 illustrates a configuration of a fifth noise filter and the electric motor drive system according to embodiment 1.
Figure 16:
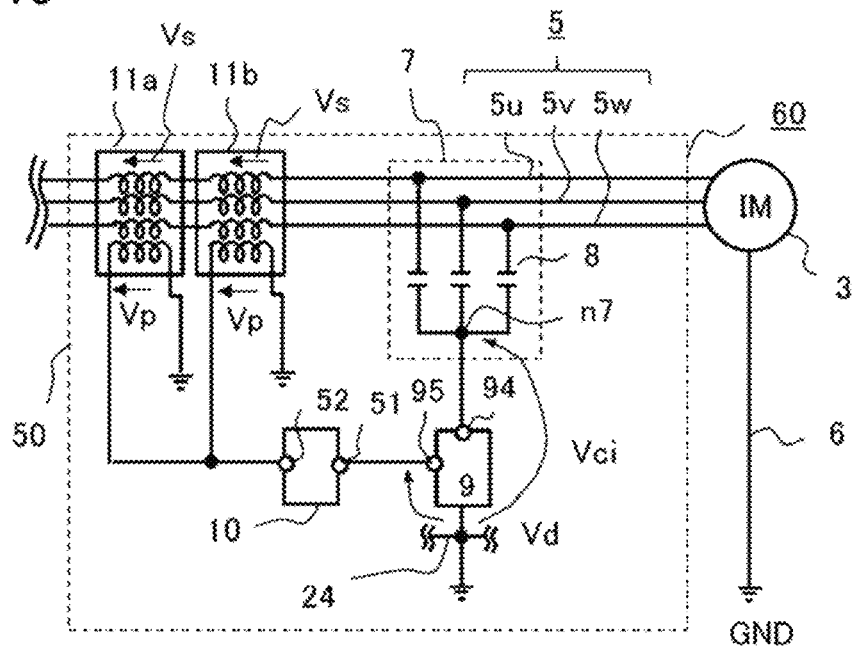
FIG. 16 illustrates a configuration of a sixth noise filter and the electric motor drive system according to embodiment 1.

FIG. 1 illustrates a configuration of a first noise filter and an electric motor drive system according to embodiment 1. FIG. 2 illustrates a configuration of a power converter in FIG. 1, and FIG. 3 illustrates a configuration of a voltage division circuit in FIG. 1. FIG. 4 illustrates a first example of an injection waveform generator in FIG. 1, FIG. 5 illustrates a second example of the injection waveform generator in FIG. 1, and FIG. 6 illustrates a third example of the injection waveform generator in FIG. 1. FIG. 7 illustrates a configuration of a second noise filter and the electric motor drive system according to embodiment 1, and FIG. 8 illustrates a configuration of a third noise filter and the electric motor drive system according to embodiment 1. FIG. 9 illustrates a configuration of a noise filter and an electric motor drive system in a comparative example. FIG. 10 illustrates a core in any of the noise filters according to embodiment 1, and FIG. 11 is a cross-sectional view taken along a broken line indicated by A-A in FIG. 10. FIG. 12 is a perspective view showing cores in the noise filter according to embodiment 1, and FIG. 13 is a perspective view showing a core in the noise filter in the comparative example. FIG. 14 illustrates a configuration of a fourth noise filter and the electric motor drive system according to embodiment 1, and FIG. 15 illustrates a configuration of a fifth noise filter and the electric motor drive system according to embodiment 1. FIG. 16 illustrates a configuration of a sixth noise filter and the electric motor drive system according to embodiment 1. A noise filter 50 according to embodiment 1 is applied to an electric motor drive system 60 which is a system for controlling an induction electric motor 3 by a power converter 2 such as a voltage-type PWM inverter in which a plurality of semiconductor elements perform switching operations.

The electric motor drive system 60 includes: an AC power supply 1 such as a power grid or a standalone voltage source; the power converter 2 which converts AC power from the AC power supply 1 into DC power and converts the DC power into AC power; a three-phase power line 4 connecting the AC power supply 1 and the power converter 2 to each other; a three-phase power line 5 connecting the power converter 2 and the induction electric motor 3 to each other; and the noise filter 50. The induction electric motor 3 is grounded by a ground wire 6. A potential at a ground GND, i.e., a ground potential, serves as a reference potential for the noise filter 50. The three-phase power line 4 includes a three-phase power line 4u for a u phase, a three-phase power line 4v for a v phase, and a three-phase power line 4w for a w phase. The three-phase power line 5 includes a three-phase power line 5u for the u phase, a three-phase power line 5v for the v phase, and a three-phase power line 5w for the w phase.

The noise filter 50 includes a voltage detector 7, a voltage division circuit 9, an injection waveform generator 10, and common mode transformers 11a and 11b. The power converter 2 includes: a forward conversion circuit 21 composed of semiconductor elements; a capacitor 22 which is a power storage element for storing therein DC power; and a reverse conversion circuit 23 which is composed of semiconductor elements and which converts DC power into AC power. The forward conversion circuit 21 is, for example, a rectification circuit and includes six diodes D1, D2, D3, D4, D5, and D6. The reverse conversion circuit 23 includes six semiconductor elements Q1, Q2, Q3, Q4, Q5, and Q6. Each of the three-phase power lines 4u, 4v, and 4w having one end connected to the AC power supply 1 has another end connected to a corresponding one of AC input terminals 41u, 41v, and 41w of the power converter 2. Each of the three-phase power lines 5u, 5v, and 5w having one end connected to the induction electric motor 3 has another end connected to a corresponding one of AC output terminals 42u, 42v, and 42w of the power converter 2.

The forward conversion circuit 21 has a first series unit composed of the diodes D1 and D2 connected in series, a second series unit composed of the diodes D3 and D4 connected in series, and a third series unit composed of the diodes D5 and D6 connected in series, the series units being disposed between a high-potential-side wire 44p and a low-potential-side wire 44s. A connection point n1 between the diode D1 and the diode D2 is connected to the AC input terminal 41u. A connection point n2 between the diode D3 and the diode D4 is connected to the AC input terminal 41v, and a connection point n3 between the diode D5 and the diode D6 is connected to the AC input terminal 41w. The capacitor 22 is connected between the high-potential-side wire 44p and the low-potential-side wire 44s. The reverse conversion circuit 23 has a fourth series unit composed of the semiconductor elements Q1 and Q2 connected in series, a fifth series unit composed of the semiconductor elements Q3 and Q4 connected in series, and a sixth series unit composed of the semiconductor elements Q5 and Q6 connected in series, the series units being disposed between the high-potential-side wire 44p and the low-potential-side wire 44s. A connection point n4 between the semiconductor element Q1 and the semiconductor element Q2 is connected to the AC output terminal 42u. A connection point n5 between the semiconductor element Q3 and the semiconductor element Q4 is connected to the AC output terminal 42v, and a connection point n6 between the semiconductor element Q5 and the semiconductor element Q6 is connected to the AC output terminal 42w.

As each of the semiconductor elements Q1, Q2, Q3, Q4, Q5, and Q6, a power semiconductor element such as a metal-oxide-semiconductor field-effect transistor (MOS-FET) or an insulated gate bipolar transistor (IGBT) is used, for example. FIG. 2 shows an example in which an MOS-FET is used. Each of the semiconductor elements Q1, Q2, Q3, Q4, Q5, and Q6 includes an MOS transistor M and a diode D. The diode D may be an element separate from the MOS transistor M or may be a parasitic diode. Drains d of the semiconductor elements Q1, Q3, and Q5 are connected to the high-potential-side wire 44p, and sources s of the semiconductor elements Q2, Q4, and Q6 are connected to the low-potential-side wire 44s. A source s of the semiconductor element Q1 and a drain d of the semiconductor element Q2 are connected to each other, a source s of the semiconductor element Q3 and a drain d of the semiconductor element Q4 are connected to each other, and a source s of the semiconductor element Q5 and a drain d of the semiconductor element Q6 are connected to each other. A control signal is inputted from a control circuit (not shown) to a gate g of each of the semiconductor elements Q1, Q2, Q3, Q4, Q5, and Q6. The reverse conversion circuit 23 switches the semiconductor elements Q1, Q2, Q3, Q4, Q5, and Q6 on the basis of the control signal from the control circuit, to convert DC power into AC power.

The voltage detector 7 which detects a common mode voltage Vci includes three capacitors 8 having capacitances equal to one another, and one end of each capacitor 8 is connected to a corresponding one of the phases of the three-phase power line 5. Other ends of the respective capacitors 8 are connected to one another at a connection point n7. The voltage division circuit 9 has: an input terminal 94 connected to the connection point n7 at which the other ends of the capacitors 8 are connected to one another; and an output terminal 95 connected to an input terminal 51 of the injection waveform generator 10. The voltage division circuit 9 divides the common mode voltage Vci which is an input voltage between the input terminal 94 and a wire 24 at the ground potential, and outputs, as an output voltage, a division voltage Vd obtained by the division.

The voltage division circuit 9 includes, for example, a capacitor 91 and a series unit composed of a resistor 92 and a resistor 93 which are connected in parallel to the capacitor 91. One end of the capacitor 91 and one end of the resistor 92 are connected to the input terminal 94, and another end of the capacitor 91 and one end of the resistor 93 are connected to the wire 24 at the ground potential. A connection point at which another end of the resistor 92 and another end of the resistor 93 are connected to each other is connected to the output terminal 95. The voltage division circuit 9 outputs, from the output terminal 95, the division voltage Vd obtained by dividing the common mode voltage Vci inputted to the input terminal 94. The detected common mode voltage Vci is divided according to the resistance ratio between the resistor 92 and the resistor 93. A voltage of the three-phase power lines 5u, 5v, and 5w which are power lines for the respective phases of the three-phase power line 5 is divided according to the impedance ratio between each capacitor 8 and the capacitor 91 and then divided according to the resistance ratio between the resistor 92 and the resistor 93. The resultant voltage is outputted from the voltage division circuit 9 as the division voltage Vd.

The division voltage Vd is inputted to the input terminal 51 of the injection waveform generator 10. The injection waveform generator 10 outputs, from an output terminal 52 thereof, a voltage having been subjected to band limitation and voltage value adjustment on the basis of the inputted division voltage Vd. The output outputted from the output terminal 52 of the injection waveform generator 10 is inputted to a primary side, i.e., a primary winding, of each of the common mode transformers 11a and 11b. Each of the common mode transformers 11a and 11b includes the primary winding on the primary side and secondary windings on a secondary side, and the secondary windings are disposed on the three-phase power lines 5u, 5v, and 5w which are power lines for the respective phases of the three-phase power line 5. The voltage outputted from the injection waveform generator 10, i.e., an output voltage Vp, is applied to the primary winding of each of the common mode transformers 11a and 11b, and an injection voltage Vs which has a polarity opposite to a polarity of the common mode voltage Vci and which is based on the turn ratio between the primary side and the secondary side is generated in the secondary windings.

The power converter 2 generates a common mode voltage Vci which is changed stepwise every time of a switching operation of any of the semiconductor elements Q1 to Q6. The common mode voltage Vci is detected by the voltage detector 7 and divided by the voltage division circuit 9 to turn into a division voltage Vd. The division voltage Vd is subjected to band limitation and voltage value adjustment by the injection waveform generator 10. The resultant voltage is outputted as an output voltage Vp which is inputted to the primary winding of each of the common mode transformers 11a and 11b. A voltage generated in the secondary windings of each of the common mode transformers 11a and 11b, i.e., an injection voltage Vs, is adjusted so as to reduce the common mode voltage Vci generated by the power converter 2. Therefore, since the noise filter 50 according to embodiment 1 is such that, on the basis of the common mode voltage Vci detected by the voltage detector 7, the output voltage Vp which has a polarity opposite to the polarity of the common mode voltage Vci and which is an adjusted voltage is inputted to each of the common mode transformers 11a and 11b and the injection voltage Vs is superimposed in the phases of the three-phase power line 5, the common mode voltage Vci can be reduced. The capability of the noise filter 50 according to embodiment 1 to reduce the common mode voltage Vci by using the common mode transformers 11a and 11b having small sizes even if the switching frequency of the power converter 2 is low, will be described.

FIG. 4 to FIG. 6 show first to third examples of the injection waveform generator 10. An injection waveform generator 10 in the first example shown in FIG. 4 includes a band limiter 12, an amplifier 13, and control power supplies 15a and 15b. The control power supply 15a supplies positive voltage, and the control power supply 15b supplies negative voltage. The band limiter 12 makes it possible to apply, to each of the common mode transformers 11a and 11b, only a component of the common mode voltage Vci that is in a frequency band for reduction, and thus the common mode transformers 11a and 11b can be downsized. The band limiter 12 only has to allow passage therethrough of a component in a target frequency band, and any of a band-pass filter, a low-pass filter, and a high-pass filter can be used. For example, if the switching frequency is 2 kHz, the frequency band targeted by the band limiter 12 is set to a band of frequencies higher than 2 kHz, and a high-pass filter having a cut-off frequency among frequencies lower than 2 kHz is connected. Consequently, a low-frequency component of the voltage to be applied to each of the common mode transformers 11a and 11b is attenuated, whereby the common mode transformers 11a and 11b can be downsized. Meanwhile, if the frequency band targeted by the band limiter 12 is set to a band of frequencies higher than 10 kHz, a high-pass filter having a cut-off frequency between 2 kHz to 10 kHz is connected. Consequently, the common mode transformers 11a and 11b can be further downsized. The amplifier 13 shown in FIG. 4 is an example of an inverting amplification circuit. The amplifier 13 includes an operational amplifier 19 and resistors 16, 17, and 18. To a positive input terminal of the operational amplifier 19, the ground potential is inputted via the resistor 17. To a negative input terminal of the operational amplifier 19, the output from the band limiter 12 is inputted via the resistor 16, and an output from the operational amplifier 19 is inputted via the resistor 18.

If the resistance values of the resistor 16 and the resistor 18 are respectively defined as r1 and r2, a gain Gi in the operational amplifier 19 can be represented by expression (1). In addition, the output voltage Vp can be represented by expression (2).

$$Gi = r2/r1 \quad (1)$$

$$Vp = -Gi \times Vd \quad (2)$$

The gain Gi in the operational amplifier 19 is set according to: a voltage-division ratio Rv in the voltage division circuit 9; a turn ratio Rr of each of the common mode transformers 11a and 11b; and a connected transformer number Nt which is the number of the connected common mode transformers 11a and 11b. The gain Gi, the voltage-division ratio Rv, the turn ratio Rr, and the connected transformer number Nt are set such that the injection voltages Vs which are voltages to be superimposed in the u-phase, the v-phase, and the w-phase of the three-phase power line 5 via the secondary windings of the common mode transformers 11a and 11b reduce the common mode voltage Vci, i.e., such that expression (3) is satisfied.

$$|Vci - Vst| \le Vto \quad (3)$$

Here, Vto is an allowable value of the difference between voltages. Expression (3) indicates that the absolute value of the difference between the common mode voltage Vci and a total injection voltage Vst is equal to or smaller than the allowable value Vto. The total injection voltage Vst is a voltage obtained by summing the injection voltages Vs generated by the common mode transformers 11a and 11b.

If the voltage values of the injection voltages are equal to one another and the connected transformer number Nt is 2, the total injection voltage Vst which is the total of the voltages superimposed in the u-phase, the v-phase, and the w-phase of the three-phase power line 5 is 2×Vs. The total injection voltage Vst which is the total of the voltages superimposed in the u-phase, the v-phase, and the w-phase of the three-phase power line 5 is represented by expression (4) with use of the connected transformer number Nt. The connected transformer number Nt in the case of FIG. 1 is 2.

$$Vst = Nt \times Vs \quad (4)$$

The voltage-division ratio Rv in the voltage division circuit 9 can be represented by expression (5). If the number of turns of the primary winding and the number of turns of the secondary windings are respectively defined as N1 and N2, the turn ratio Rr of each of the common mode transformers 11a and 11b can be represented by expression (6).

$$Rv = Vci/Vd \quad (5)$$

$$Rr = N2/N1 \quad (6)$$

As the connected transformer number Nt becomes larger, the voltage to be inputted to one of the common mode transformers, i.e., the output voltage Vp from the injection waveform generator 10, and the injection voltage Vs which is the voltage to be outputted in the secondary windings of the common mode transformer, can be reduced more relative to a certain value of the common mode voltage Vci. Since the plurality of common mode transformers 11a and 11b are included, the noise filter 50 according to embodiment 1 enables the common mode transformers 11a and 11b having small sizes to superimpose the total injection voltage Vst in the u-phase, the v-phase, and the w-phase of the three-phase power line 5. Therefore, in the noise filter 50 according to embodiment 1, a common mode voltage can be reduced by using common mode transformers having small sizes even if the switching frequency is low. The capability to downsize the common mode transformers by reducing the injection voltages Vs thereof will be described later.

An injection waveform generator 10 in the second example will be described. The injection waveform generator 10 in the second example is different from the injection waveform generator 10 in the first example in that a current buffer 14 is added between an output terminal of the amplifier 13 and the output terminal 52. It is noted that the output terminal of the amplifier 13 is a connection point between the resistor 18 and a wire through which the output from the operational amplifier 19 is transmitted. In the injection waveform generator 10 in the second example, a current capacity indicating a current supply amount can be made higher than in the injection waveform generator 10 in the first example. The current buffer 14 includes, for example, two transistors BT1 and BT2 connected in series. A collector c of the transistor BT1 is connected to the control power supply 15a, an emitter e of the transistor BT1 is connected to an emitter e of the transistor BT2, and a collector c of the transistor BT2 is connected to the control power supply 15b. The output from the amplifier 13 is inputted to bases b of the transistors BT1 and BT2, and the emitters e of the transistors BT1 and BT2 are connected to the output terminal 52.

Although an example in which the amplifier 13 is an inverting amplification circuit has been described regarding each of the injection waveform generator 10 in the first example and the injection waveform generator 10 in the second example, the amplifier 13 may be a non-inverting amplification circuit. An injection waveform generator 10 in the third example shown in FIG. 6 is an example in which a non-inverting amplification circuit is used. To the positive input terminal of the operational amplifier 19, the output from the band limiter 12 is inputted via the resistor 17. To the negative input terminal of the operational amplifier 19, the ground potential is inputted via the resistor 16, and the output from the operational amplifier 19 is inputted via the resistor 18.

If the resistance values of the resistor 16 and the resistor 18 are respectively defined as r1 and r2, the gain Gi in the operational amplifier 19 as a non-inverting amplification circuit can be represented by expression (7). In addition, the output voltage Vp can be represented by expression (8).

$$Gi=1+r2/r1 \quad (7)$$

$$Vp=Gi \times Vd \quad (8)$$

In the case where the amplifier 13 is a non-inverting amplification circuit, the direction of connection to the primary winding of each of the common mode transformers 11a and 11b is changed to an opposite direction as shown in FIG. 7, and setting is made such that the injection voltage Vs which is the voltage to be outputted in the secondary windings reduces the common mode voltage Vci. Next, the noise filter 50 according to embodiment 1 will be described while being compared to a noise filter 100 in a comparative example.

The noise filter 100 in the comparative example shown in FIG. 9 includes one common mode transformer 101, and an electric motor drive system 110 in the comparative example includes the noise filter 100. In the noise filter 100 in the comparative example, an output voltage Vpe is outputted from an injection waveform generator 102 to the primary winding of the common mode transformer 101, and an injection voltage Vse is superimposed in the u-phase, the v-phase, and the w-phase of the three-phase power line 5. The noise filter 100 in the comparative example is different from the noise filter 50 according to embodiment 1 in that: one common mode transformer 101 is included; and the injection waveform generator 10 is replaced with the injection waveform generator 102. The injection waveform generator 102 has the same configuration as that of the injection waveform generator 10 but has a different gain Gi or the like depending on the value of the output voltage Vpe. In the noise filter 100 in the comparative example, the connected transformer number Nt is 1. In order to realize the same level of reduction in the common mode voltage even with a different number of common mode transformers, the total injection voltage Vst needs to have the same value. Therefore, as known from expression (4), the noise filter 100 in the comparative example cannot realize the same level of reduction in the common mode voltage unless an injection voltage Vse that is two times each injection voltage Vs superimposed in the phases of the three-phase power line 5 by the noise filter 50 according to embodiment 1 in which the connected transformer number Nt is 2, is superimposed in the phases of the three-phase power line 5. Therefore, the noise filter 100 in the comparative example needs to satisfy expression (9) in order to realize the same level of reduction in the common mode voltage as that of the noise filter 50 according to embodiment 1.

$$Vse=2 \times Vs \quad (9)$$

In order to satisfy expression (9), two methods are contemplated, for example. A first one of the methods involves setting the output voltage Vpe to be equal to the output voltage Vp and doubling the turn ratio Rr of the common mode transformer 101. A second one of the methods involves setting the turn ratio Rr of the common mode transformer 101 to be equal to the turn ratio Rr of each of the common mode transformers 11a and 11b and setting the output voltage Vpe to be two times the output voltage Vp.

Each of the common mode transformers 11a and 11b includes one primary winding and three secondary windings. A core of each of the common mode transformers 11a and 11b is, for example, a toroidal core 28 shown in FIG. 10. Since the noise filter 50 according to embodiment 1 includes the two common mode transformers 11a and 11b, two cores 28 are included as shown in FIG. 12. The common mode transformer 101 in the comparative example is also the same as each of the common mode transformers 11a and 11b in this respect. Since the noise filter 100 in the comparative example includes the one common mode transformer 101, one core 29 is included as shown in FIG. 13. The sizes of the cores will be described later.

In the first method, the turn ratio Rr of the common mode transformer 101 is increased by means of: reduction in the number of turns of the primary winding; or increase in the number of turns of the secondary windings. In the case of reducing the number of turns of the primary winding, excitation current of the common mode transformer 101 is increased, and magnetic fluxes are also increased. In order to avoid magnetic saturation of the core used for the common mode transformer 101, the cross-sectional area of the core needs to be increased. Meanwhile, in the case of increasing the number of turns of the secondary windings, the core needs to have a larger inner diameter since windings each having approximately the same diameter as that of the three-phase power line 5 are wound for three phases as the secondary windings. As a result, the core is upsized. In the case where a voltage having a voltage value equal to or higher than that of the voltage of each of the control power supplies 15a and 15b is generated as the injection voltage Vse in the secondary windings of the common mode transformer 101, upsizing of the core is unavoidable.

Meanwhile, in the second method, application of high voltage to the common mode transformer 101 necessitates a high-voltage-durability element and a control power supply that outputs high voltage. In addition, the voltage-time product in the common mode transformer 101 is increased. Thus, in order to avoid magnetic saturation of the core, the cross-sectional area of the core needs to be increased, and the number of turns of the primary winding needs to be increased. Further, the number of turns of the secondary windings is also increased in order to keep the turn ratio Rr unchanged. As a result, application of high voltage to the common mode transformer 101 also leads to upsizing of the core.

Considering the above drawbacks, the noise filter 50 according to embodiment 1 includes the plurality of common mode transformers 11a and 11b so that the injection voltage Vs to be generated per common mode transformer can be made low. Consequently, unlike the noise filter 100 in the comparative example, the noise filter 50 according to embodiment 1 eliminates the need for increasing the cross-sectional areas of the cores of the common mode transformers 11a and 11b and eliminates the need for increasing the inner diameters of the cores in order to increase the number of turns. Therefore, the cores can be downsized. Moreover, in the noise filter 50 according to embodiment 1, the voltage to be applied to each of the common mode transformers 11a and 11b, i.e., the output voltage Vp, may be a low voltage. Consequently, the voltage-time product can be made low, whereby the cores can be downsized. In addition, in the noise filter 50 according to embodiment 1, the voltage from each of the control power supplies 15a and 15b to be applied to the injection waveform generator 10 may be a low voltage. Consequently, the injection waveform generator 10 can be made of a low-voltage-durability element.

The common mode suppressing circuit in Patent Document 1 includes one common mode transformer in which the turn ratio Rr is 1. As described above, if the switching frequency is low, the time product of magnetic fluxes generated in the core is increased so that the core to be used for the common mode transformer is upsized in order to generate the same voltage in the secondary windings. With one common mode transformer, the upsizing becomes prominent. Meanwhile, the noise filter 50 according to embodiment 1 includes the two common mode transformers 11a and 11b. Thus, if the common mode suppressing circuit in Patent Document 1 superimposes the same total injection voltage Vst on the three-phase power line 5, the injection voltage Vs to be superimposed by each of the common mode transformers 11a and 11b can be set to Vst/2. Since the injection voltage Vs is Vst/2, the voltage-time product can be made small, and furthermore, magnetic fluxes to be generated from the cores can also be made small. Consequently, the cross-sectional areas of the cores can be made small. Therefore, in the noise filter 50 according to embodiment 1, common mode transformers having cores having smaller sizes than in the common mode suppressing circuit in Patent Document 1 can be used.

The sizes of the cores in the noise filter 50 according to embodiment 1 will be described with reference to FIG. 10 to FIG. 13. Each core in the noise filter 50 according to embodiment 1 is, for example, the toroidal core 28 shown in FIG. 10 as described above. Since the noise filter 50 according to embodiment 1 includes the two common mode transformers 11a and 11b, two cores 28 are included as shown in FIG. 12. Since the noise filter 100 in the comparative example includes the one common mode transformer 101, one core 29 is included as shown in FIG. 13. The core 28 has an inner diameter 1, an outer diameter L, and a width (thickness) h. The core 28 has a cross-sectional area S. In FIG. 11, the left side is the inner side of the core 28, and the right side is the outer side of the core 28. Firstly, a case where output voltages Vp having the same voltage value are applied to the two common mode transformers 11a and 11b as in FIG. 1, will be contemplated. A magnetic flux density B of magnetic fluxes generated from the core 28 can be represented by expression (10).

$$B=(Vp \times t)/(N1 \times S) \tag{10}$$

t is a time of applying the output voltages Vp.

Judging from expression (10), reduction in the voltage-time product (Vp×t) makes it possible to reduce the cross-sectional area S while the magnetic flux density B and the number of turns N1 on the primary side are kept unchanged. A case where the magnetic flux density of magnetic fluxes generated from the core 29 of the common mode transformer 101 in the comparative example and the total magnetic flux density of magnetic fluxes generated from the cores 28 of the two common mode transformers 11a and 11b in embodiment 1 are equal to each other, will be contemplated. In this case, the relationship between the cross-sectional area S of each core 28 and a cross-sectional area Se of the core 29 is represented by expression (11).

$$Se=2 \times S \tag{11}$$

The cross-sectional area Se and a volume v1 of the core 29 can be represented by expressions (12) and (13). The cross-sectional area Se of the core 29 is the area of a cross section taken along a broken line indicated by A-A in the case where the core 28 in FIG. 10 is replaced with the core 29. The width of the core 29 is h which is equal to the width of the core 28.

$$Se=h \times (Le-1)/2 \tag{12}$$

$$v1=\pi \times h \times (Le2-1^2)/4 \tag{13}$$

The cross-sectional area S and a volume v2 of the core 28 can be represented by expressions (14) and (15).

$$S=h \times (L-l)/2 \tag{14}$$

$$v2=\pi \times h \times (L2-l^2)/4 \tag{15}$$

If expression (11) is subjected to substitution with expressions (12) and (14) and transformation, expression (11) becomes expression (16).

$$L=(Le+1)/2 \tag{16}$$

By transformation with expression (16), the volume v2 in expression (15) is represented by expression (17).

$$v2=\pi \times h \times (Le^2+2Le \times l-3l^2)/16 \tag{17}$$

Judging from expression (13) and expression (17), the volume v1 of the core 29 and the total volume 2×v2 of the two cores 28 satisfy a relationship represented by expression (18).

$$v1 > 2 \times v2 \tag{18}$$

Judging from above, if the output voltage Vp having the same voltage value as that in the one common mode transformer 101 is divided at the two common mode transformers 11a and 11b, and injection voltages Vs having the same voltage value are superimposed on the three-phase power line 5, the following consequences are obtained. In the common mode transformers 11a and 11b of the noise filter 50 according to embodiment 1, setting of the outer diameter L of one of the cores 28 to be smaller than the outer diameter Le under a condition that the magnetic flux density B and the inner diameter 1 are unchanged makes it possible to reduce the total volume, i.e., the total size, of the cores 28 while the cross-sectional area S per core 28 is kept at ½ of the cross-sectional area Se of the core 29. Here, the inner diameter 1 can be kept unchanged if: the number of turns N1 is unchanged; and a required inner diameter is unchanged.

Meanwhile, in the case where the common mode transformers 11a and 11b superimpose injection voltages Vsa and Vsb having different voltage values on the three-phase power line 5 as in FIG. 8, an operation of reducing the total voltage according to the allowable value can be performed unlike in the common mode transformer in Patent Document 1. Consequently, the cross-sectional area S of each core 28 can be made small, and the total volume (total size) of the two cores 28 can be made small.

In the noise filter 50 according to embodiment 1, the total size of the two common mode transformers can be made smaller than that of the common mode transformer in Patent Document 1. In the noise filter 50 according to embodiment 1, the two common mode transformers having small sizes are used so that the degree of freedom in arrangement of the common mode transformers is higher than in the common mode suppressing circuit in Patent Document 1. Consequently, in the noise filter 50 according to embodiment 1, parts can be arranged more efficiently than in the common mode suppressing circuit in Patent Document 1, and a noise filter having a small size can be realized. Further, in the noise filter 50 according to embodiment 1, the injection waveform generator 10 performs, on the division voltage Vd, band limitation for eliminating therefrom a component having a frequency that inflicts a significant influence on upsizing of the cores, whereby the sizes of the common mode transformers 11a and 11b can be made even smaller than that of the common mode transformer in Patent Document 1. That is, if the injection voltages Vs to be applied by the plurality of common mode transformers 11a and 11b are made sufficiently low, the sizes of the common mode transformers 11a and 11b can be made smaller than that of the common mode transformer in Patent Document 1 even if band limitation for eliminating a component having a frequency that inflicts a significant influence on upsizing of the cores is not performed.

In the common mode suppressing circuit in Patent Document 1, power of a control power supply is power of an input-side DC power supply of an inverter, and thus a high-voltage-durability transistor is necessary. Meanwhile, in the noise filter 50 according to embodiment 1, each injection voltage Vs is ½ of the injection voltage in the common mode suppressing circuit in Patent Document 1, and the output voltage Vp to be outputted from the injection waveform generator 10 can be made lower than that in the common mode suppressing circuit in Patent Document 1. Consequently, the injection waveform generator can be made of a low-voltage-durability element.

Although a case where the core material, the outer diameter L, the inner diameter 1, and the cross-sectional area S of the core 28, and the numbers of turns N1 and N2 are the same between the common mode transformers 11a and 11b has been described, any of the core material, the outer diameter L, the inner diameter 1, and the cross-sectional area S of the core 28, and the numbers of turns N1 and N2 may be different therebetween. In this case, as shown in FIG. 8, even though the output voltages Vp from the injection waveform generator 10 inputted to the common mode transformers 11a and 11b are equal to each other, the injection voltage Vsa generated by the common mode transformer 11a and the injection voltage Vsb generated by the common mode transformer 11b are sometimes different from each other. In this case, for the total injection voltage Vst, expression (19) is used instead of expression (4).

$$Vst=Vsa+Vsb \quad (19)$$

The injection voltage Vs described in comparison to the comparative example and the common mode suppressing circuit in Patent Document 1 may be regarded as being ½ of the total injection voltage Vst also in the case where the injection voltage Vsa and the injection voltage Vsb are different from each other. Therefore, the sizes of the common mode transformers 11a and 11b in the noise filter 50 according to embodiment 1 can be made smaller than those of the common mode transformer in the noise filter 100 in the comparative example and the common mode transformer in the common mode suppressing circuit in Patent Document 1.

Although an example in which the voltage detector 7 shown in FIG. 1 is connected to the three-phase power line 5 has been described, the voltage detector 7 can also be connected to the three-phase power line 4 as shown in FIG. 14. The power converter 2 generates a common mode voltage Vci with respect to the three-phase power line 4 as well. In this case as well, the common mode voltage Vci detected from the three-phase power line 4 is equal to the common mode voltage Vci detected from the three-phase power line 5, and thus expression (3) only has to be satisfied. In addition, although an example in which the common mode transformers 11a and 11b are disposed on the three-phase power line 5 has been described, the common mode transformers 11a and 11b can also be disposed on the three-phase power line 4 as shown in FIG. 15. By reducing the common mode voltage Vci on the three-phase power line 4, the common mode voltage Vci on the three-phase power line 5 can be reduced. Although an example in which the voltage detector 7 is connected to the three-phase power line 4 has been shown in FIG. 15, the voltage detector 7 may be connected to the three-phase power line 5. Further, the positions of the common mode transformers 11a and 11b and the position of the voltage detector 7 may be exchanged as shown in FIG. 16. Although the noise filter 50 in the first example shown in FIG. 1 has a feedforward configuration, a noise filter 50 in a sixth example shown in FIG. 16 has a feedback configuration.

Although a voltage division circuit 9 including the capacitor 91 and the resistors 92 and 93 has been described as an example of the voltage division circuit 9, the voltage division circuit 9 is not limited thereto. The voltage division circuit 9 can also be formed to have any of: a configuration in which only two capacitors 91 connected in series are provided; a configuration in which only the resistors 92 and 93 are provided; and furthermore, a configuration in which the numbers of capacitors and resistors are increased.

As described above, the noise filter 50 according to embodiment 1 is a noise filter for reducing a common mode voltage Vci generated by the power converter 2 which performs power conversion through switching operations of the semiconductor elements Q1 to Q6. The noise filter 50 includes: the voltage detector 7 which detects the common mode voltage Vci generated by the power converter 2; the voltage division circuit 9 which outputs a division voltage Vd obtained by dividing the common mode voltage Vci detected by the voltage detector 7; the plurality of common mode transformers 11a and 11b which superimpose injection voltages Vs (Vsa and Vsb) each having a polarity opposite to the polarity of the common mode voltage Vci onto an output from or an input to the power converter 2; and the injection waveform generator 10 which generates, on the basis of the division voltage Vd, output voltages Vp to be outputted to the primary sides of the plurality of common mode transformers 11a and 11b. The injection waveform generator 10 generates the output voltages Vp such that the difference between the common mode voltage Vci and the total injection voltage Vst obtained by summing the injection voltages Vs (Vsa and Vsb) to be superimposed by the plurality of common mode transformers 11a and 11b is equal to or smaller than the allowable value Vto. In this configuration, the noise filter 50 according to embodiment 1 includes the plurality of common mode transformers 11a and 11b, and the injection waveform generator 10 generates the output voltages Vp such that the difference between the common mode voltage Vci and the total injection voltage Vst obtained by summing the injection voltages Vs (Vsa and Vsb) to be superimposed by the plurality of common mode transformers 11a and 11b is equal to or smaller than the allowable value Vto. Consequently, the common mode voltage Vci can be reduced by using the common mode transformers 11a and 11b having small sizes even if the switching frequency is low.

Embodiment 2

Figure 17:
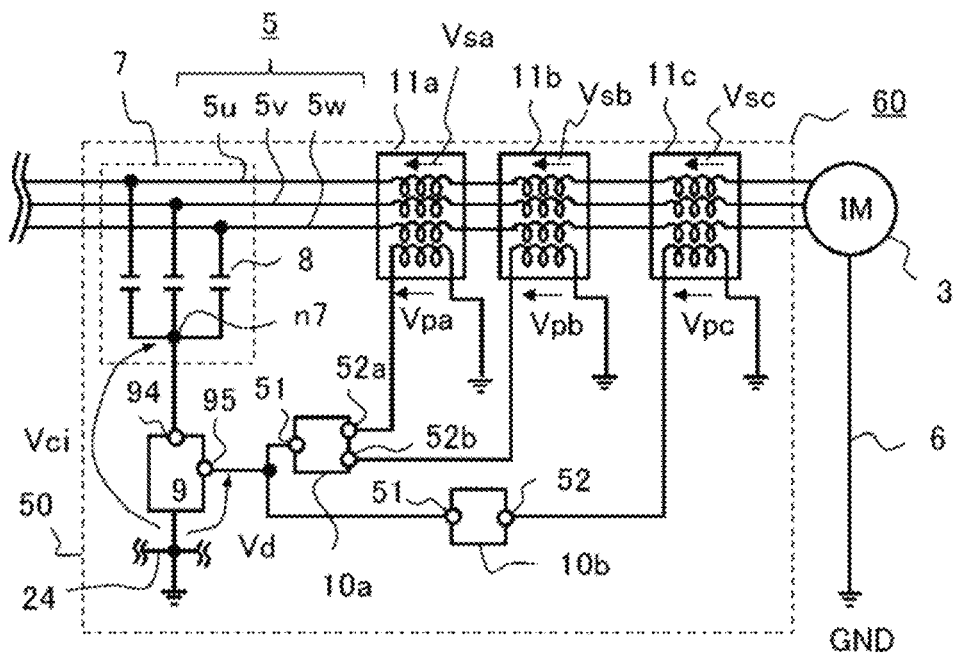
FIG. 17 illustrates a configuration of a first noise filter and the electric motor drive system according to embodiment 2.
Figure 18:
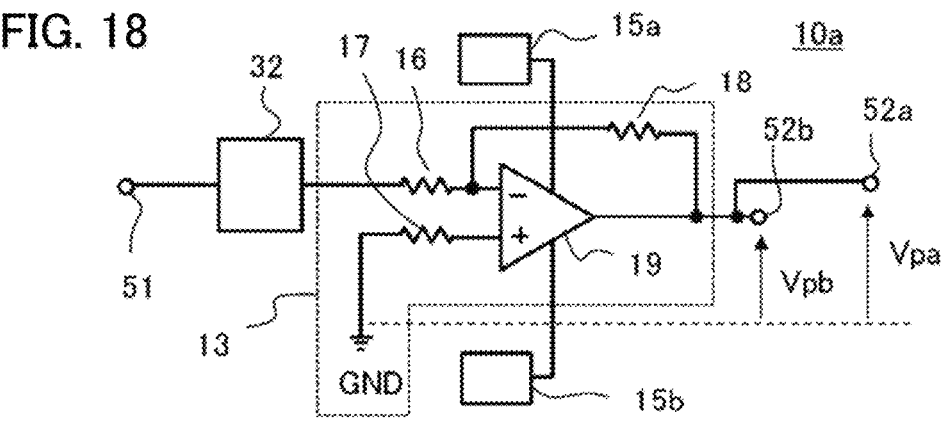
FIG. 18 illustrates a first example of a first injection waveform generator in FIG. 17.
Figure 19:
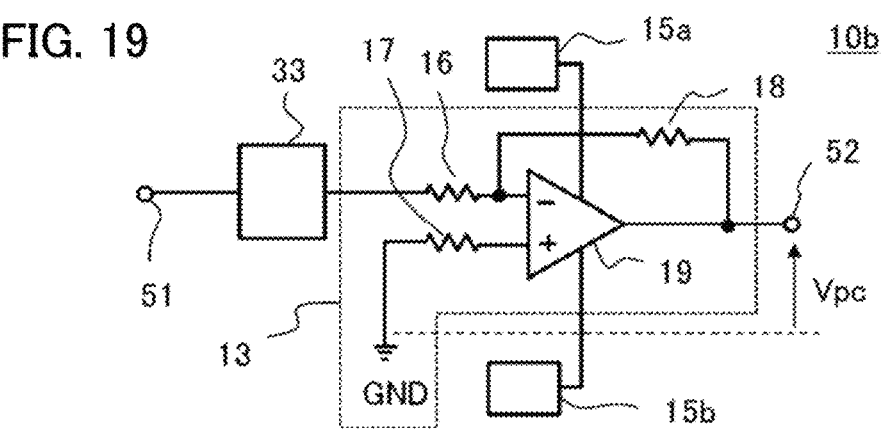
FIG. 19 illustrates a first example of a second injection waveform generator in FIG. 17.

FIG. 17 illustrates a configuration of a first noise filter and the electric motor drive system according to embodiment 2. FIG. 18 illustrates a first example of a first injection waveform generator in FIG. 17, and FIG. 19 illustrates a first example of a second injection waveform generator in FIG.

Figure 20:
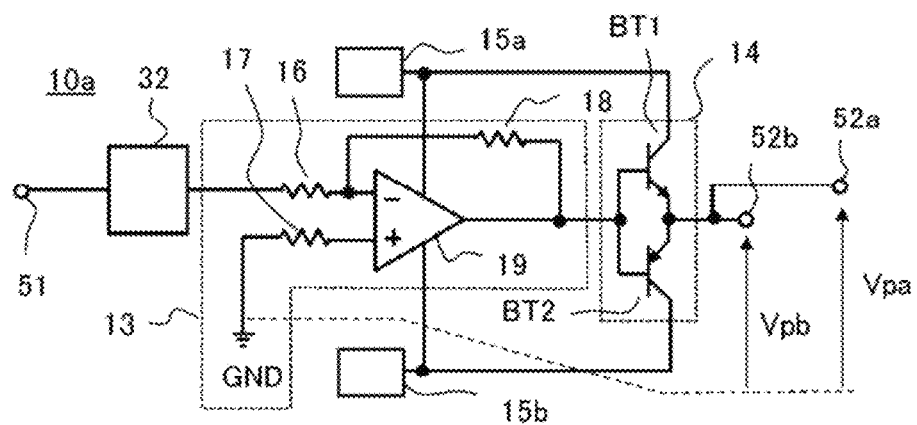
FIG. 20 illustrates a second example of the first injection waveform generator in FIG. 17.
Figure 21:
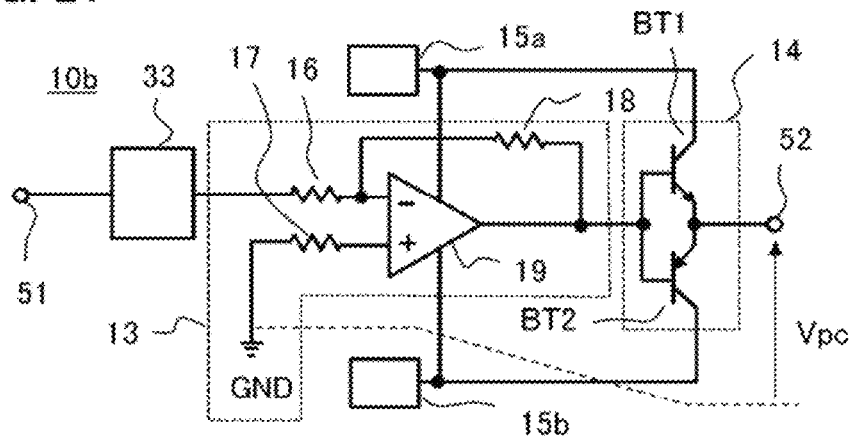
FIG. 21 illustrates a second example of the second injection waveform generator in FIG. 17.
Figure 22:
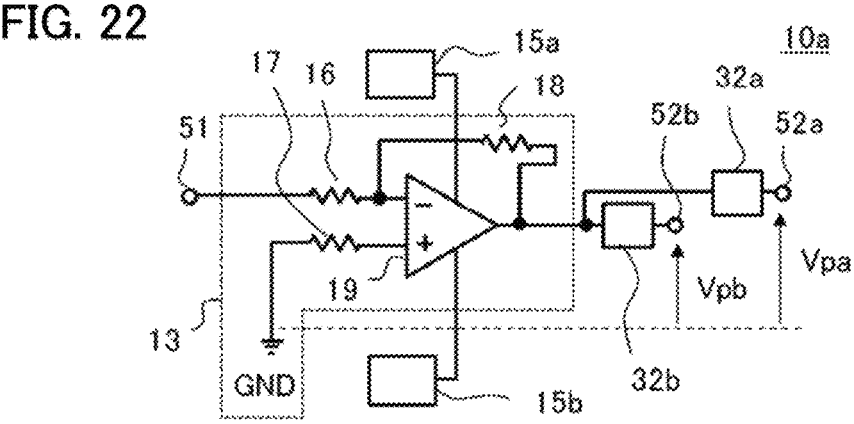
FIG. 22 illustrates a third example of the first injection waveform generator in FIG. 17.
Figure 23:
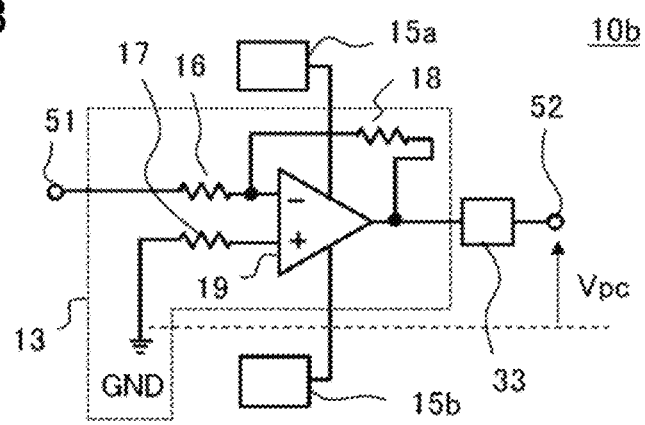
FIG. 23 illustrates a third example of the second injection waveform generator in FIG. 17.
Figure 24:
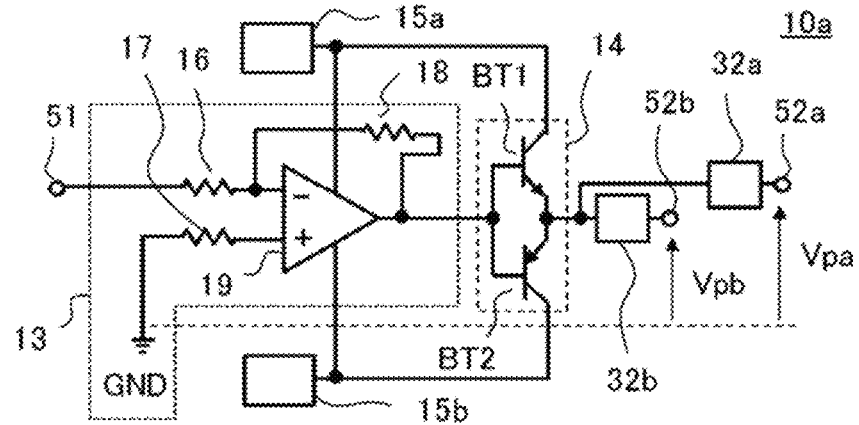
FIG. 24 illustrates a fourth example of the first injection waveform generator in FIG. 17.
Figure 25:
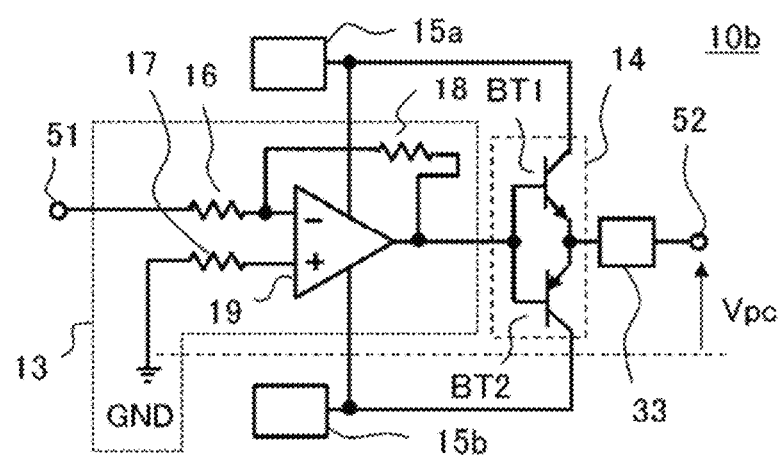
FIG. 25 illustrates a fourth example of the second injection waveform generator in FIG. 17.
Figure 26:
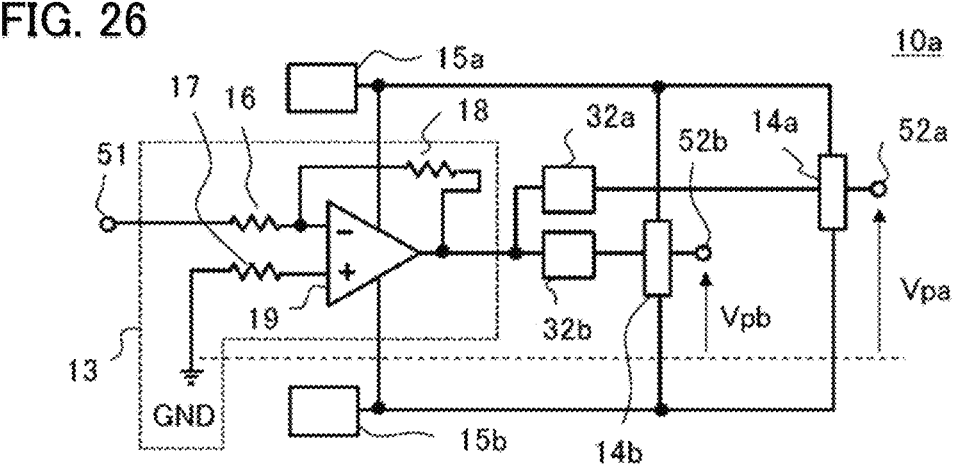
FIG. 26 illustrates a fifth example of the first injection waveform generator in FIG. 17.
Figure 27:
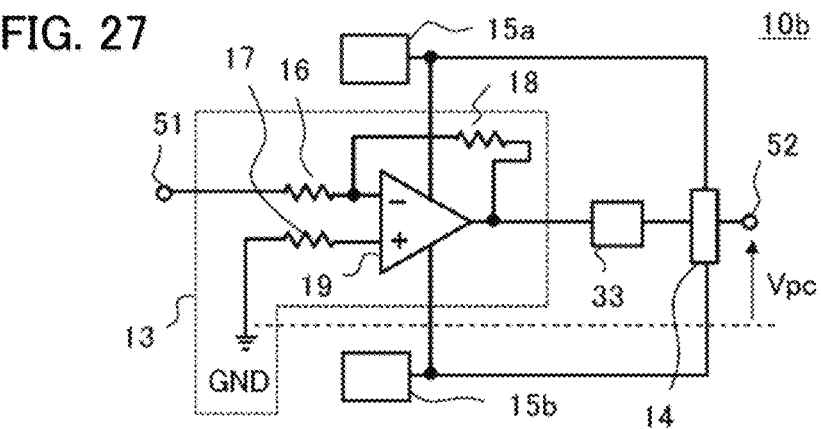
FIG. 27 illustrates a fifth example of the second injection waveform generator in FIG. 17.
Figure 28:
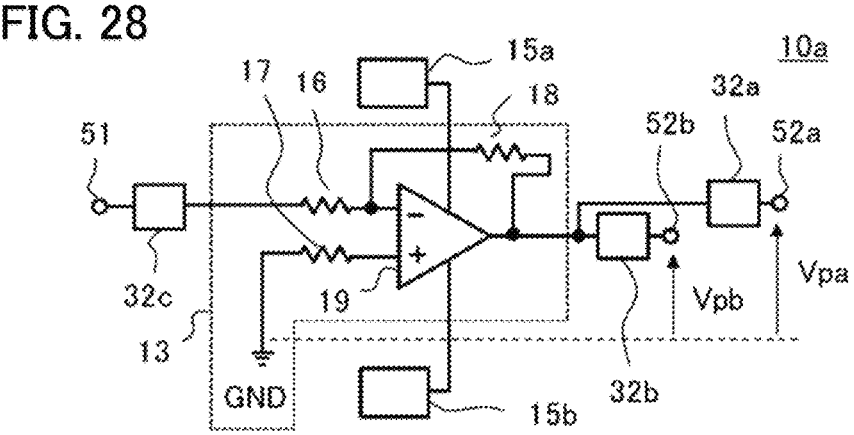
FIG. 28 illustrates a sixth example of the first injection waveform generator in FIG. 17.
Figure 29:
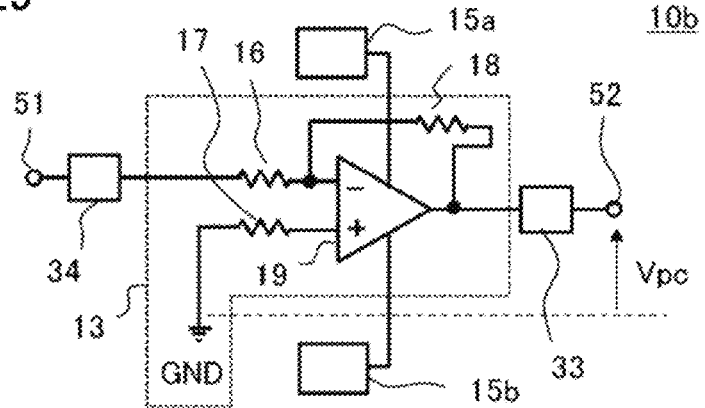
FIG. 29 illustrates a sixth example of the second injection waveform generator in FIG. 17.
Figure 30:
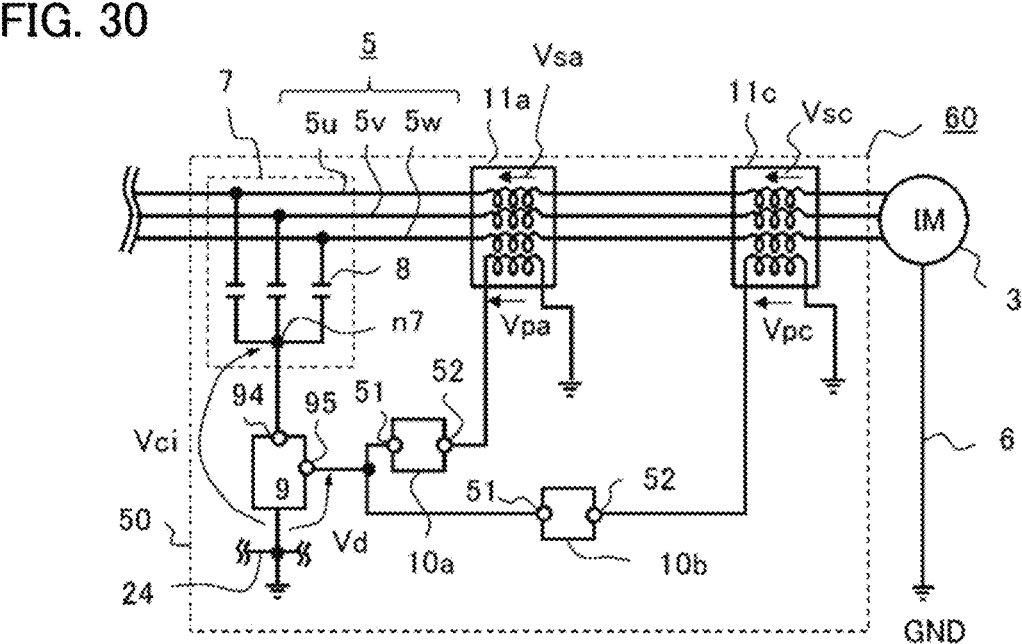
FIG. 30 illustrates a configuration of a second noise filter and the electric motor drive system according to embodiment 2.
Figure 31:
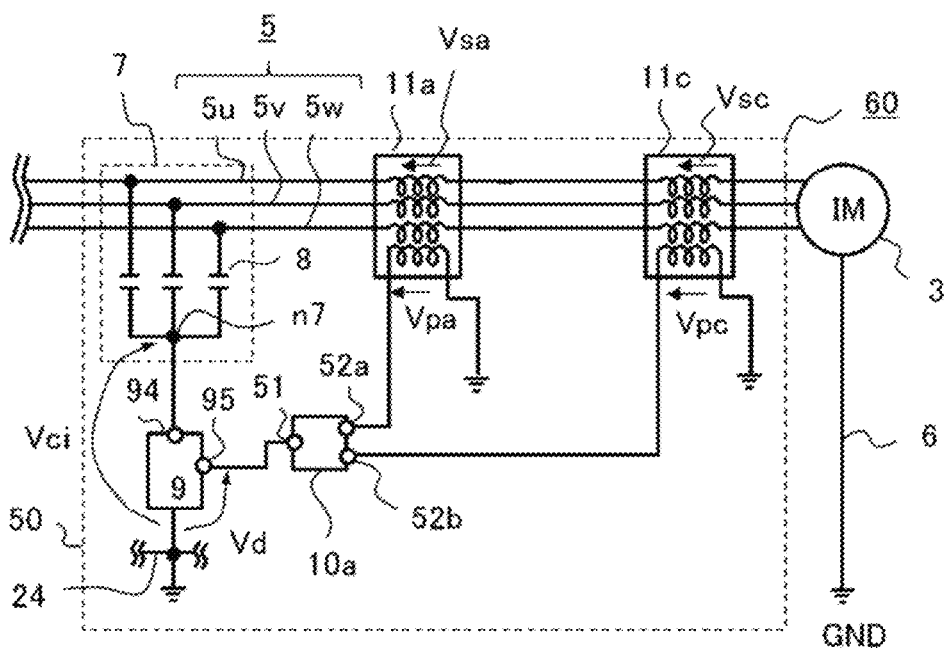
FIG. 31 illustrates a configuration of a third noise filter and the electric motor drive system according to embodiment 2.

17. FIG. 20 illustrates a second example of the first injection waveform generator in FIG. 17, and FIG. 21 illustrates a second example of the second injection waveform generator in FIG. 17. FIG. 22 illustrates a third example of the first injection waveform generator in FIG. 17, and FIG. 23 illustrates a third example of the second injection waveform generator in FIG. 17. FIG. 24 illustrates a fourth example of the first injection waveform generator in FIG. 17, and FIG. 25 illustrates a fourth example of the second injection waveform generator in FIG. 17. FIG. 26 illustrates a fifth example of the first injection waveform generator in FIG. 17, and FIG. 27 illustrates a fifth example of the second injection waveform generator in FIG. 17. FIG. 28 illustrates a sixth example of the first injection waveform generator in FIG. 17, and FIG. 29 illustrates a sixth example of the second injection waveform generator in FIG. 17. FIG. 30 illustrates a configuration of a second noise filter and the electric motor drive system according to embodiment 2, and FIG. 31 illustrates a configuration of a third noise filter and the electric motor drive system according to embodiment 2.

The noise filter 50 according to embodiment 2 shown in FIG. 17 is different from the noise filter 50 according to embodiment 1 in that: output voltages Vpa, Vpb, and Vpc are outputted to three common mode transformers 11a, 11b, and 11c by two injection waveform generators 10a and 10b; and injection voltages Vsa, Vsb, and Vsc are generated in the phases of the three-phase power line 5 by the three common mode transformers 11a, 11b, and 11c. The first example of the first injection waveform generator 10a shown in FIG. 18 is different from the injection waveform generator 10 shown in FIG. 4 in that: the band limiter 12 is replaced with a band limiter 32 which allows passage therethrough of a voltage in a low-frequency band and which reduces a voltage in a high-frequency band; and the first injection waveform generator 10a has two output terminals 52a and 52b. The first example of the second injection waveform generator 10b shown in FIG. 19 is different from the injection waveform generator 10 shown in FIG. 4 in that the band limiter 12 is replaced with a band limiter 33 which allows passage therethrough of a voltage in the high-frequency band and which reduces a voltage in the low-frequency band. The injection waveform generator 10a outputs the output voltage Vpa from the output terminal 52a and outputs the output voltage Vpb from the output terminal 52b. The injection waveform generator 10b outputs the output voltage Vpc from the output terminal 52. It is noted that the wire 24 at the ground potential is not shown in FIG. 18 and FIG. 19. The wire 24 at the ground potential is not shown in FIG. 20 to FIG. 29, either. It is noted that the noise filter 50 according to embodiment 2 can also be said to include an injection waveform generator including two waveform generators (injection waveform generators 10a and 10b).

The differences from the noise filter 50 according to embodiment 1 will be mainly described. The injection waveform generator 10a is set to amplify only a voltage in the low-frequency band and reduce a voltage in the high-frequency band. Meanwhile, the injection waveform generator 10b is set to amplify only a voltage in the high-frequency band and reduce a voltage in the low-frequency band. That is, the injection waveform generator 10a outputs the output voltages Vpa and Vpb in the low-frequency band to the common mode transformers 11a and 11b, and the injection waveform generator 10b outputs the output voltage Vpc in the high-frequency band to the common mode transformer 11c. The output voltages Vpa and Vpb are in a frequency band different from the frequency band for the output voltage Vpc. Consequently, a voltage in the low-frequency band is applied to each of the common mode transformers 11a and 11b connected to the injection waveform generator 10a, and a voltage in the high-frequency band is applied to the common mode transformer 11c connected to the injection waveform generator 10b. Each of the output voltages Vpa and Vpb may have a voltage value different from that of the output voltage Vpc according to the frequency bands.

In general, as a voltage in a band of higher frequencies is applied to a transformer, less magnetic fluxes are generated in a core thereof owing to properties of a core material. Thus, since less magnetic fluxes lead to a smaller voltage-time product in the transformer, a cross-sectional area, of the core, required for the transformer becomes smaller. Therefore, the size of the common mode transformer 11c to which a voltage in the high-frequency band is applied can be made smaller than that of each of the common mode transformers 11a and 11b.

Alternatively, the common mode transformer 11c can be downsized also by reducing the numbers of turns N1 and N2 of the common mode transformer 11c instead of reducing the cross-sectional area S of the core 28. In the case of reducing the numbers of turns N1 and N2, an inner diameter 1 required for the core 28 becomes smaller. In the case where the cross-sectional area S of the core 28 is set to be unchanged, the inner diameter 1 is reduced, and this reduction also enables reduction in the outer diameter L. As a result, the common mode transformer 11c can be downsized. These means for the downsizing can also be performed simultaneously. If the voltage-time product in the transformer is small, it is also possible to reduce the cross-sectional area S of the core 28 and reduce the outer diameter L and the inner diameter 1 of the core 28 through reduction in the numbers of turns N1 and N2.

In general, a transformer is influenced by a self-resonance based on the inductance and the parasitic capacitance thereof, and, in the high-frequency band, the impedance thereof is reduced so that excitation current is increased. The self-resonance frequency varies among core materials. Considering this, a core material having a high self-resonance frequency and having a high impedance also in the high-frequency band is used for the common mode transformer 11c to which a voltage in the high-frequency band is applied, whereby excitation current can be reduced. This makes it possible to reduce power supply capacities indicating the power supply amounts of the control power supplies 15a and 15b which each supply power to the injection waveform generator 10b.

In this manner, in the present embodiment 2, the two injection waveform generators 10a and 10b have different configurations, the three common mode transformers 11a, 11b, and 11c have different configurations, and the voltage to be applied is separated into a voltage in the low-frequency band and a voltage in the high-frequency band. This makes it possible to downsize the core of each common mode transformer and reduce the power supply capacities of the control power supplies 15a and 15b. In the case where the power supply capacities of the control power supplies 15a and 15b are reduced, for example, increase in the gain Gi in the amplifier 13 enables the output voltages Vpa, Vpb, and Vpc to be equal to those obtained in the case where the power supply capacities of the control power supplies 15a and 15b are not reduced.

The second example of the first injection waveform generator 10a shown in FIG. 20 is different from the injection waveform generator 10 shown in FIG. 5 in that: the band limiter 12 is replaced with the band limiter 32 which allows passage therethrough of a voltage in the low-frequency band and which reduces a voltage in the high-frequency band; and the first injection waveform generator 10a has the two output terminals 52a and 52b. The second example of the second injection waveform generator 10b shown in FIG. 21 is different from the injection waveform generator 10 shown in FIG. 5 in that the band limiter 12 is replaced with the band limiter 33 which allows passage therethrough of a voltage in the high-frequency band and which reduces a voltage in the low-frequency band. The injection waveform generator 10a outputs the output voltage Vpa from the output terminal 52a and outputs the output voltage Vpb from the output terminal 52b. The injection waveform generator 10b outputs the output voltage Vpc from the output terminal 52. In addition, the second example of the first injection waveform generator 10a is different from the first example of the first injection waveform generator 10a in that the current buffer 14 is added between the output terminal of the amplifier 13 and the output terminals 52a and 52b. The second example of the second injection waveform generator 10b is different from the first example of the second injection waveform generator 10b in that the current buffer 14 is added between the output terminal of the amplifier 13 and the output terminal 52. In the second example of the first injection waveform generator 10a and the second example of the second injection waveform generator 10b, the current buffers 14 enable the current capacities indicating the current supply amounts to be higher than in the injection waveform generators 10a and 10b in the first example.

The third example of the first injection waveform generator 10a shown in FIG. 22 is different from the first example of the first injection waveform generator 10a shown in FIG. 18 in that: no band limiter 32 is provided on the input terminal 51 side; and band limiters 32a and 32b are disposed between the output terminal of the amplifier 13 and the output terminals 52a and 52b, respectively. A frequency band in the band limiter 32a and a frequency band in the band limiter 32b may be equal to each other or different from each other. In the case where the frequency band in the band limiter 32a and the frequency band in the band limiter 32b are different from each other, output voltages Vpa and Vpb in different frequency bands can be outputted. It is noted that frequencies in the frequency bands for the output voltages Vpa and Vpb are lower than those in the frequency band for the output voltage Vpc. The third example of the second injection waveform generator 10b shown in FIG. 23 is different from the first example of the second injection waveform generator 10b shown in FIG. 19 in that: no band limiter 33 is provided on the input terminal 51 side; and the band limiter 33 is disposed between the output terminal of the amplifier 13 and the output terminal 52.

The fourth example of the first injection waveform generator 10a shown in FIG. 24 is different from the third example of the first injection waveform generator 10a in that the current buffer 14 is added between the output terminal of the amplifier 13 and the input sides of the band limiters 32a and 32b. The fourth example of the second injection waveform generator 10b shown in FIG. 25 is different from the third example of the second injection waveform generator 10b in that the current buffer 14 is added between the output terminal of the amplifier 13 and the input side of the band limiter 33. In the fourth example of the first injection waveform generator 10a and the fourth example of the second injection waveform generator 10b, the current buffers 14 enable the current capacities indicating the current supply amounts to be higher than in the injection waveform generators 10a and 10b in the third example.

Although the fourth example of the first injection waveform generator 10a shown in FIG. 24 is an example in which the current buffer 14 is disposed between the output terminal of the amplifier 13 and the input sides of the band limiters 32a and 32b, the current buffer 14 may be disposed between the output side of each of the band limiters 32a and 32b and the corresponding one of the output terminals 52a and 52b. The fifth example of the first injection waveform generator 10a shown in FIG. 26 is different from the third example of the first injection waveform generator 10a in that: a current buffer 14a is added between the output side of the band limiter 32a and the output terminal 52a; and a current buffer 14b is added between the output side of the band limiter 32b and the output terminal 52b. In the fifth example of the first injection waveform generator 10a, the current buffers 14a and 14b enable the current capacities indicating the current supply amounts to be higher than in the injection waveform generator 10a in the third example.

Likewise, although the fourth example of the second injection waveform generator 10b shown in FIG. 25 is an example in which the current buffer 14 is disposed between the output terminal of the amplifier 13 and the input side of the band limiter 33, the current buffer 14 may be disposed between the output side of the band limiter 33 and the output terminal 52. The fifth example of the second injection waveform generator 10b shown in FIG. 27 is different from the third example of the second injection waveform generator 10b in that the current buffer 14 is added between the output side of the band limiter 33 and the output terminal 52. In the fifth example of the second injection waveform generator 10b, the current buffer 14 enables the current capacities indicating the current supply amounts to be higher than in the injection waveform generator 10b in the third example.

The sixth example of the first injection waveform generator 10a shown in FIG. 28 is different from the third example of the first injection waveform generator 10a in that a band limiter 32c is disposed between the input terminal 51 and the input side of the amplifier 13. The sixth example of the second injection waveform generator 10b shown in FIG. 29 is different from the third example of the second injection waveform generator 10b in that a band limiter 34 is disposed between the input terminal 51 and the input side of the amplifier 13. As in the band limiters 32a and 32b, frequencies in the frequency band in the band limiter 32c are lower than those in the frequency bands in the band limiters 33 and 34 of the second injection waveform generator 10b. As in the band limiter 33, frequencies in the frequency band in the band limiter 34 are higher than those in the frequency bands in the band limiters 32a, 32b, and 32c of the first injection waveform generator 10a.

In the sixth example of the first injection waveform generator 10a, the band limiter 32c is included also on the input side, and thus the band limiters 32a and 32b on the output side can be downsized. Therefore, in the sixth example of the first injection waveform generator 10a, the band limiters 32a, 32b, and 32c having small sizes enable the total power consumption of the band limiters to be lower than in the third example of the first injection waveform generator 10a including the two band limiters 32a and 32b. In the sixth example of the second injection waveform generator 10b, the band limiter 34 is included also on the input side, and thus the band limiter 33 on the output side can be downsized. Therefore, in the sixth example of the second injection waveform generator 10b, the band limiters 33 and 34 having small sizes enable the total power consumption of the band limiters to be lower than in the third example of the second injection waveform generator 10*b* including the one band limiter 33.

Although a case where the number of the injection waveform generators is two and the number of the common mode transformers is three has been shown in FIG. 17, the numbers are not limited thereto. For example, as in FIG. 30, the output voltages Vpa and Vpc may be outputted from the two injection waveform generators 10*a* and 10*b* to the two common mode transformers 11*a* and 11*c*. A second noise filter 50 according to embodiment 2 shown in FIG. 30 is different from the noise filter 50 according to embodiment 1 shown in FIG. 1 in that the output voltages Vpa and Vpc are outputted to the two common mode transformers 11*a* and 11*c* by the two injection waveform generators 10*a* and 10*b*.

Alternatively, for example, the output voltages Vpa and Vpc may be outputted from one injection waveform generator 10*a* to the two common mode transformers 11*a* and 11*c* as in FIG. 31. In this case, the injection waveform generator 10*a* includes the band limiters 32*a* and 32*b* on the side where the output terminals 52*a* and 52*b* are present, and the injection waveform generator 10*a* shown in any of FIG. 22, FIG. 24, FIG. 26, and FIG. 28 is applicable to this case.

Although a case where the injection waveform generators 10*a* and 10*b* have different frequency bands, i.e., different frequency characteristics, has been described, the injection waveform generators 10*a* and 10*b* can be configured to have the same gain and the same frequency characteristic as well. In this case, the noise filter 50 according to embodiment 2 performs substantially the same functions as those of the noise filter 50 according to embodiment 1, and thus exhibits the same advantageous effects as those of the noise filter 50 according to embodiment 1. It is noted that the injection waveform generators 10*a* and 10*b* may include amplifiers 13 having gains different from each other and may output the output voltages Vpa and Vpc having different voltage values.

Although a case where the core material, the outer diameter L, the inner diameter 1, and the cross-sectional area S of the core 28, and the numbers of turns N1 and N2 are different among the common mode transformers 11*a*, 11*b*, and 11*c* has been described, a configuration in which the core material, the outer diameter L, the inner diameter 1, and the cross-sectional area S of the core 28, and the numbers of turns N1 and N2 are the same thereamong can also be employed.

Although, regarding each of the noise filters 50 according to embodiment 1 and embodiment 2, an example in which the noise filter 50 is applied to the electric motor drive system 60 mounted with the power converter 2 for performing conversion from three-phase AC power via DC power into three-phase AC power has been described, the noise filters 50 are not limited to this example. Each of the noise filters 50 according to embodiment 1 and embodiment 2 is applicable also to a system mounted with a power converter that generates a common mode voltage through switching operations of semiconductor elements. For example, the power converter 2 may be an insulation-type DC-DC converter. In this case, the AC power supply 1 is replaced with a DC power supply, and the induction electric motor 3 is replaced with a DC electric motor.

As described above, the noise filter 50 according to embodiment 2 includes: the common mode transformer 11*a* to which the output voltage Vpa in the low-frequency band is inputted; and the common mode transformer 11*c* to which the output voltage Vpc in the high-frequency band is inputted. Consequently, the size of the common mode transformer 11*c* for the high-frequency band can be made smaller than that of the common mode transformer 11*a* for the low-frequency band. Therefore, the noise filter 50 according to embodiment 2 enables further downsizing as compared to the common mode transformer in Patent Document 1, whereby a common mode voltage can be reduced by using common mode transformers having small sizes even if the switching frequency is low. In addition, if the noise filter 50 according to embodiment 2 includes a plurality of common mode transformers, for the low-frequency band, that have larger sizes than the common mode transformer 11*c* for the high-frequency band, the injection voltage Vsa, Vsb per common mode transformer is reduced as described in embodiment 1. Consequently, the sizes of the common mode transformers 11*a* and 11*b* can be further reduced and can be made smaller than that of the common mode transformer in Patent Document 1.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure. It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 2 power converter
7 voltage detector
9 voltage division circuit
10 injection waveform generator
10*a*, 10*b* injection waveform generator (waveform generator)
11*a*, 11*b*, 11*c* common mode transformer
12 band limiter
13 amplifier
28 core
32, 32*a*, 32*b*, 32*c* band limiter
33 band limiter
34 band limiter
50 noise filter
52, 52*a*, 52*b* output terminal
Gi gain
1 inner diameter
L outer diameter
Nt connected transformer number
Q1, Q2, Q3, Q4, Q5, Q6 semiconductor element
Rr turn ratio
S cross-sectional area
Vci common mode voltage
Vd division voltage
Vp, Vpa, Vpb, Vpc output voltage
Vs, Vsa, Vsb, Vsc injection voltage
Vst total injection voltage

The invention claimed is:

1. A noise filter for reducing a common mode voltage generated by a power converter which performs power conversion through a switching operation of a semiconductor element, the noise filter comprising:
   a voltage detector which detects the common mode voltage generated by the power converter;
   a voltage division circuit which outputs a division voltage obtained by dividing the common mode voltage detected by the voltage detector;
   a plurality of common mode transformers which superimpose injection voltages each having a polarity opposite to a polarity of the common mode voltage onto an output from or an input to the power converter; and
   an injection waveform generator which generates, on the basis of the division voltage, output voltages to be outputted to primary sides of the plurality of common mode transformers, wherein
   the injection waveform generator generates the output voltages such that a difference between the common mode voltage and a total injection voltage obtained by summing the injection voltages to be superimposed by the plurality of common mode transformers is equal to or smaller than an allowable value.

2. The noise filter according to claim 1, wherein
   the injection waveform generator outputs the output voltages, which are equal to one another, to the primary sides of all of the common mode transformers.

3. The noise filter according to claim 2, wherein
   the plurality of common mode transformers include a first common mode transformer and a second common mode transformer, and
   at least one of a core material, a cross-sectional area of a core, an outer diameter of the core, an inner diameter of the core, and a turn ratio differs between the first common mode transformer and the second common mode transformer.

4. The noise filter according to claim 2, wherein
   the injection waveform generator includes a band limiter which changes a frequency band for the division voltage.

5. The noise filter according to claim 2, wherein
   the injection waveform generator includes an amplifier which amplifies the division voltage, and
   a gain in the amplifier is set on the basis of the number of the common mode transformers and a turn ratio of each common mode transformer.

6. The noise filter according to claim 1, wherein
   the injection waveform generator has a plurality of output terminals, and
   the output voltages different from one another are outputted from the respective output terminals to the primary sides of the corresponding common mode transformers.

7. The noise filter according to claim 6, wherein
   the output voltages different from one another and outputted from the injection waveform generator have different voltage values.

8. The noise filter according to claim 7, wherein
   the injection waveform generator includes a band limiter which changes a frequency band for the division voltage, and
   the output voltages different from one another and outputted from the injection waveform generator are in different frequency bands.

9. The noise filter according to claim 6, wherein
   the injection waveform generator includes a band limiter which changes a frequency band for the division voltage, and
   the output voltages different from one another and outputted from the injection waveform generator are in different frequency bands.

10. The noise filter according to claim 1, wherein
    the injection waveform generator includes a plurality of waveform generators, and
    the waveform generators respectively output the output voltages, which are different from one another, to the primary sides of the corresponding common mode transformers.

11. The noise filter according to claim 10, wherein
    the output voltages different from one another and outputted from the injection waveform generator have different voltage values.

12. The noise filter according to claim 10, wherein
    the injection waveform generator includes a band limiter which changes a frequency band for the division voltage, and
    the output voltages different from one another and outputted from the injection waveform generator are in different frequency bands.

13. The noise filter according to claim 1, wherein
    the injection waveform generator includes a band limiter which changes a frequency band for the division voltage.

14. The noise filter according to claim 1, wherein
    the injection waveform generator includes an amplifier which amplifies the division voltage, and
    a gain in the amplifier is set on the basis of the number of the common mode transformers and a turn ratio of each common mode transformer.

15. The noise filter according to claim 1, wherein
    the plurality of common mode transformers include a first common mode transformer and a second common mode transformer, and
    at least one of a core material, a cross-sectional area of a core, an outer diameter of the core, an inner diameter of the core, and a turn ratio differs between the first common mode transformer and the second common mode transformer.

16. The noise filter according to claim 15, wherein
    the injection waveform generator includes a first waveform generator and a second waveform generator,
    the first waveform generator outputs a first one of the output voltages to the first common mode transformer, and
    the second waveform generator outputs a second one of the output voltages to the second common mode transformer.

17. The noise filter according to claim 16, wherein
    the first output voltage has a voltage value different from a voltage value of the second output voltage.

18. The noise filter according to claim 16, wherein
    each of the first waveform generator and the second waveform generator includes a band limiter which changes a frequency band for the division voltage, and
    the first output voltage is in a frequency band different from a frequency band for the second output voltage.

19. The noise filter according to claim 16, wherein
    each of the first waveform generator and the second waveform generator includes an amplifier which amplifies the division voltage, and a gain in the amplifier is set on the basis of the number of the common mode transformers and a turn ratio of each common mode transformer.

20. The noise filter according to claim 1, wherein the voltage detector detects the common mode voltage generated by the power converter which outputs three-phase AC power, and each common mode transformer includes three secondary-side windings.

* * * * *